(12) United States Patent
Iwasa

(10) Patent No.: US 11,145,267 B2
(45) Date of Patent: Oct. 12, 2021

(54) LIQUID CRYSTAL DISPLAY DEVICE AND DRIVING METHOD THEREFOR

(71) Applicant: JVCKENWOOD CORPORATION, Yokohama (JP)

(72) Inventor: Takayuki Iwasa, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/887,227

(22) Filed: May 29, 2020

(65) Prior Publication Data

US 2020/0294458 A1 Sep. 17, 2020

Related U.S. Application Data

(63) Continuation of application No. PCT/JP2018/042638, filed on Nov. 19, 2018.

(30) Foreign Application Priority Data

Nov. 30, 2017 (JP) .............................. JP2017-230091

(51) Int. Cl.
 *G09G 3/36* (2006.01)
(52) U.S. Cl.
 CPC ......... *G09G 3/3614* (2013.01); *G09G 3/3648* (2013.01); *G09G 2300/0439* (2013.01)
(58) Field of Classification Search
 CPC ............... G09G 3/3614; G09G 3/3648; G09G 2300/0439
 See application file for complete search history.

(56) References Cited

U.S. PATENT DOCUMENTS

| | | | | |
|---|---|---|---|---|
| 2004/0239655 A1* | 12/2004 | Tani | ..................... | G09G 3/3648 345/204 |
| 2006/0221033 A1* | 10/2006 | Yasuda | ................ | G09G 3/3648 345/92 |
| 2013/0241974 A1* | 9/2013 | Teranishi | ............. | G09G 3/3648 345/691 |
| 2014/0078195 A1* | 3/2014 | Iwasa | ................... | G09G 3/3688 345/691 |
| 2014/0232706 A1* | 8/2014 | Iwasa | ................... | G09G 3/3648 345/206 |
| 2014/0267200 A1* | 9/2014 | Iwasa | ....................... | G09G 3/36 345/204 |
| 2014/0320477 A1* | 10/2014 | Izawa | ................... | G09G 3/3655 345/212 |

(Continued)

FOREIGN PATENT DOCUMENTS

| | | | |
|---|---|---|---|
| JP | 5733154 B2 | 6/2015 |
| JP | 6115056 B2 | 4/2017 |

*Primary Examiner* — Antonio Xavier
(74) *Attorney, Agent, or Firm* — Procopio, Cory, Hargreaves & Savitch LLP

(57) ABSTRACT

According to an embodiment, a liquid crystal display device includes a plurality of pixels and a control circuit, each of the pixels includes a first switch, a second switch, a first storage unit, a second storage unit, a liquid crystal display element, and a control circuit, and the control circuit is configured to simultaneously overwrite the subframe data held in the first storage unit provided in each of the plurality of pixels with fixed data, and to simultaneously transfer the fixed data held in the first storage unit to the second storage unit by turning on the second switch provided in each of the plurality of pixels.

5 Claims, 9 Drawing Sheets

(56) References Cited

U.S. PATENT DOCUMENTS

2014/0320482 A1\* 10/2014 Kawanaka ........... G09G 3/3659
 345/214
2016/0300552 A1 10/2016 Iwasa
2019/0197938 A1\* 6/2019 Iwasa ..................... G02F 1/133

\* cited by examiner

LIQUID CRYSTAL DISPLAY DEVICE AND DRIVING METHOD THEREFOR

CROSS REFERENCE TO RELATED APPLICATION

This application is a Bypass Continuation of PCT/JP2018/042638 filed on Nov. 19, 2018, which is based upon and claims the benefit of priority from Japanese Patent Application No. 2017-230091, filed on Nov. 30, 2017, the entire contents of which are incorporated herein by reference.

BACKGROUND

The present invention relates to a liquid crystal display device and a driving method therefor, and particularly relates to a reflective liquid crystal display device suitable to improve image quality and a driving method therefor.

A subframe driving method is known as one of halftone display methods employed in liquid crystal display devices. In a subframe driving method which is one type of time base modulation method, a predetermined period (one frame that is a unit for display of one image in the case of moving pictures, for example) is divided into a plurality of subframes, and pixels are driven in a combination of subframes according to a gradation for display. The gradation for display is determined according to the ratio of a pixel drive period occupied in a predetermined period, and this ratio is specified by the combination of subframes.

In the liquid crystal display devices which employ this subframe driving method, one is known in which pixels includes a master latch, a slave latch, a liquid crystal display element, and a plurality of switching transistors.

In this pixel, one bit of first data is applied to an input terminal of the master latch through a first switching transistor, and when a row select signal applied through a row scanning line is active, the first switching transistor is turned on and the first data is written into the master latch.

After the writing of data into the master latches provided in all the pixels is completed, second switching transistors provided in all the pixels are turned on in a subframe period. As a result, the data that are written into the master latches provided in all the pixels are simultaneously read out to the slave latches, and the data that are written into the slave latches are applied to the pixel electrode of the liquid crystal display element. In each subframe period, similar processes are performed on all the pixels. As a result, a desired gradation display can be performed with combinations of a plurality of subframes constituting one frame.

The periods of the plurality of subframes constituting one frame are allocated to the same or different predetermined periods. For example, in each pixel, when a maximum gradation display is performed (white is displayed), the display is performed on all the plurality of subframes constituting one frame. When a minimum gradation display is performed (black is displayed), the display is not performed on any of the subframes constituting one frame, and subframes for display are selected according to the gradation for display in a case where the other gradation displays are performed. This liquid crystal display device of the related art uses digital data indicating a gradation as input data and adopts a digital driving method using a two-stage latch configuration (for example, see Japanese Patent No. 5733154 and Japanese Patent No. 6115056).

In the liquid crystal display devices disclosed in Japanese Patent No. 5733154 and Japanese Patent No. 6115056, subframe data is sequentially written for each column into a plurality of pixels provided in a two-dimensional matrix, and after writing of subframe data into all the pixels is completed, the subframe data is simultaneously applied to liquid crystal display elements of all the pixels. Therefore, when a time required to write the subframe into all the pixels increases as the number of pixels increases, an interval between a time when the subframe data is applied to the liquid crystal display elements of all the pixels and a time when the next subframe data is applied becomes long. In other words, the period during which one subframe data is applied to the liquid crystal display elements of all the pixels (a subframe period) is rate-controlled by the time required to write the subframe data into all the pixels, and becomes longer. Thus, the liquid crystal display devices disclosed in Japanese Patent No. 5733154 and Japanese Patent No. 6115056 have a problem that a subframe period of a minimum bit cannot be sufficiently shortened, the number of gradations cannot increase, and consequently, image quality cannot be improved.

SUMMARY

A liquid crystal display device according to an aspect of an embodiment includes: a plurality of pixels each configured to display an image of a gradation level obtained by combining a plurality of 1-bit subframe data for each frame, and provided in a matrix pattern; and a control circuit. Each of the pixels includes: a SRAM cell; a DRAM cell; and a liquid crystal display element. The SRAM cell includes: a first switch configured to sample the subframe data; and a first data holding unit configured to hold the subframe data sampled by the first switch. The DRAM cell includes: a second switch configured to sample the subframe data held in the first data holding unit; and a second data holding unit configured to hold the subframe data sampled by the second switch and to apply the held subframe data to a reflecting electrode of the liquid crystal display element. The control circuit is configured to simultaneously overwrite the subframe data held in the first data holding unit provided in each of the plurality of pixels with fixed data, and to simultaneously transfer the fixed data held in the first data holding unit to the second data holding unit by turning on the second switch provided in each of the plurality of pixels.

A driving method for a liquid crystal display device according to another aspect of an embodiment is a driving method for a liquid crystal display device including a plurality of pixels each configured to display an image of a gradation level obtained by combining a plurality of 1-bit subframe data for each frame, and provided in a matrix pattern, each of the pixels including: a SRAM cell; a DRAM cell; and a liquid crystal display element, the SRAM cell including: a first switch configured to sample the subframe data; and a first data holding unit configured to hold the subframe data sampled by the first switch, the DRAM cell including: a second switch configured to sample the subframe data held in the first data holding unit; and a second data holding unit configured to hold the subframe data sampled by the second switch and to apply the held subframe data to a reflecting electrode of the liquid crystal display element, the driving method for a liquid crystal display device, including: simultaneously overwriting the subframe data held in the first data holding unit provided in each of the plurality of pixels with fixed data; and simultaneously transferring the fixed data held in the first data holding unit to the second data holding unit by turning on the second switch provided in each of the plurality of pixels.

DETAILED DESCRIPTION

First Embodiment

An embodiment of the present invention will be described below with reference to the drawings.

Figure 1:
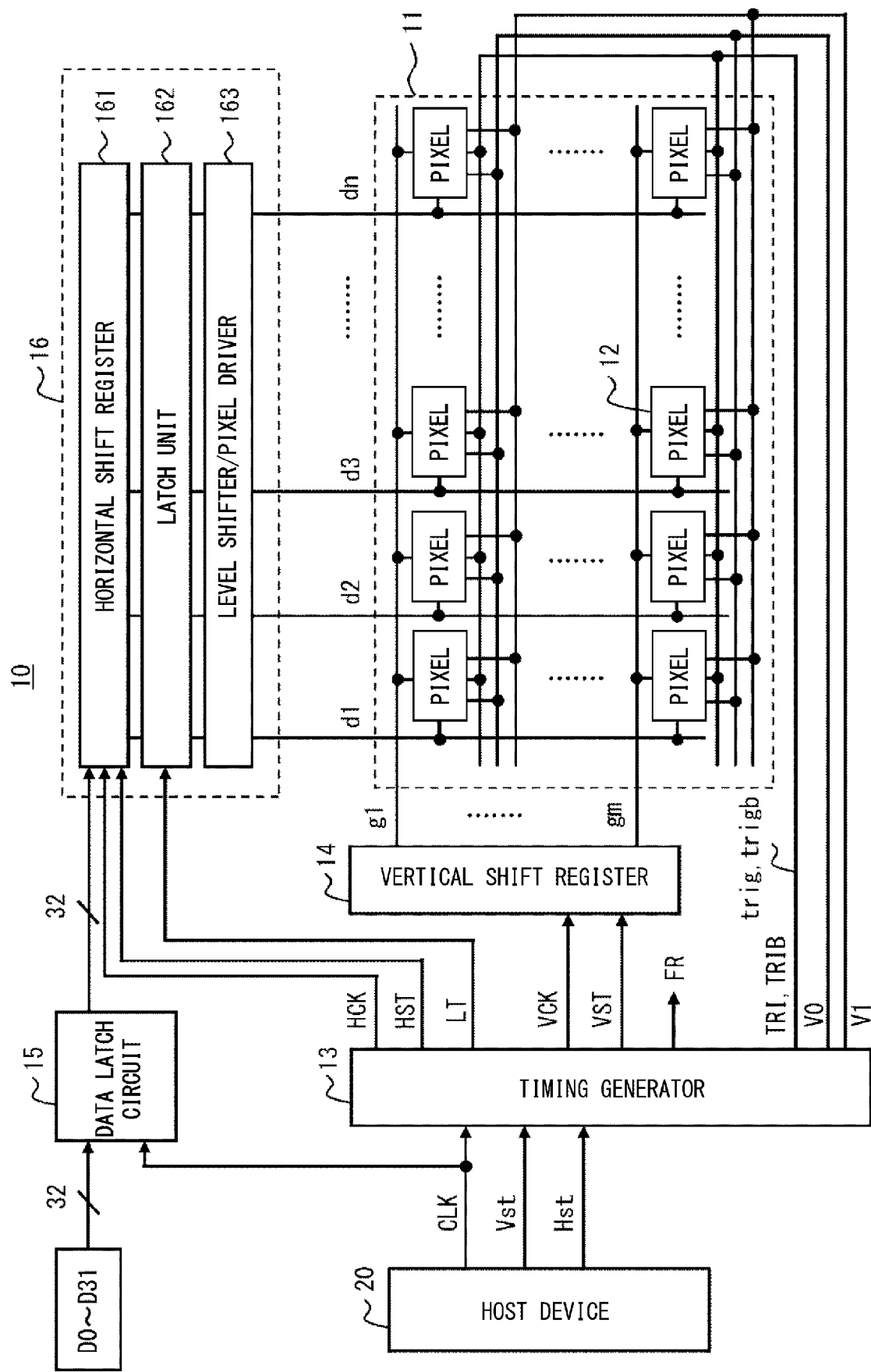
FIG. 1 is a block diagram showing a liquid crystal display device according to a first embodiment.

FIG. 1 is a block diagram showing a liquid crystal display device 10 according to the first embodiment.

As shown in FIG. 1, the liquid crystal display device 10 includes an image display unit 11, a timing generator 13, a vertical shift register 14, a data latch circuit 15, and a horizontal driver 16. The horizontal driver 16 includes a horizontal shift register 161, a latch unit 162, and a level shifter/pixel driver 163.

The image display unit 11 includes a plurality of pixels 12 which are regularly disposed in each of multiple pixel disposition areas partitioned in rows and columns.

A plurality of pixels 12 are formed by disposing m (m is a natural number equal to or more than two) row scanning lines g1 to gm whose one ends are connected to the vertical shift register 14 and which extend in a row direction (X direction), and n (n is a natural number equal to or more than two) column data lines d1 to dn whose one ends are connected to the level shifter/pixel driver 163 and which extend in a column direction (Y direction) in a two-dimensional matrix pattern at a plurality of intersecting portions which intersect each other. All the pixels 12 in the image display unit 11 are commonly connected to trigger lines trig and trigb whose one ends are connected to the timing generator 13. A forward trigger pulse TRI is transmitted by the trigger line trig and an inverted trigger pulse TRIB which is an inverted signal of the forward trigger pulse TRI is transmitted by the trigger line trigb.

In this embodiment, a case where n column data lines d1 to dn are provided is described as an example, but the present invention is not limited to this. When a column data line dj (j is an arbitrary value of 1 to n) by which a forward data are transmitted and a column data line dbj by which an inverted data are transmitted are set as 1 set, total n set of the column data lines d1, db1 to dn, and dbn may be provided. In addition, the forward data transmitted by the column data line dj and the inverted data transmitted by the column data line dbj are 1-bit data having a relationship of a reverse logical value (complementary relationship) at all times.

The timing generator 13 receives, as input signals, external signals such as a vertical synchronization signal Vst, a horizontal synchronization signal Hst, a basic clock CLK, or the like output from a host device 20, and generates various internal signals such as current-alternating signal FR, a V start pulse VST, an H start pulse HST, clock signals VCK and HCK, a latch pulse LT, and the trigger pulses TRI, TRIB, or the like based on these external signals.

The current-alternating signal FR is a signal whose polarity is inverted for each subframe, and is supplied, as a common electrode voltage Vcom to be described below, to a common electrode of liquid crystal display elements in the pixels 12 which constitute the image display unit 11.

The start pulse VST is a pulse signal output at a start timing of each subframe to be described below, and this start pulse VST controls switching of each subframe.

The start pulse HST is a pulse signal output to the horizontal shift register 161 at a start timing of the horizontal shift register 161.

The clock signal VCK is a shift clock which defines one horizontal scan period (1 H) in the vertical shift register 14, and the vertical shift register 14 performs a shifting operation at a timing of the clock signal VCK.

The clock signal HCK is a shift clock in the horizontal shift register 161, and is a signal for shifting data at a 32-bit width.

The latch pulse LT is a pulse signal which is output at a timing at which the horizontal shift register 161 completes shifting of data corresponding to the number of pixels in one row in a horizontal direction.

The forward trigger pulse TRI and the reverse trigger pulse TRIB are pulse signals which are supplied to all the pixels 12 in the image display unit 11 via the trigger lines trig and trigb, respectively.

Here, the trigger pulse TRI is output from the timing generator 13 after data is written into a first data holding unit of all the pixels 12 within the image display unit 11 in a certain subframe period. Thus, in this subframe period, data held by the first data holding units of all the pixels 12 of the image display unit 11 is simultaneously transferred to second data holding units of each corresponding pixels 12.

The vertical shift register 14 transfers the V start pulse VST supplied at the start timing of each subframe according to the clock signal VCK, and sequentially supplies exclusively a row scanning signal to the row scanning lines g1 to gm in a 1 H unit. Thus, the row scanning lines are sequentially selected one by one in the 1 H unit from the row scanning line g1 at the top of the image display unit 11 to the row scanning line gm at the bottom.

The data latch circuit 15 latches data of the 32-bit width in one subframe unit supplied from an external circuit (not shown) based on the basic clock CLK from a host device 20, and then outputs the data to the horizontal shift register 161 in synchronization with the basic clock CLK.

In addition, the liquid crystal display device 10 divides one frame of a video signal into a plurality of subframes having shorter display periods than one frame period of this video signal, and displays a gradation in a combination of these subframes. Accordingly, the above-mentioned external circuit converts gradation data indicating the gradation of each pixel into a plurality of pieces of 1-bit subframe data corresponding to the plurality of subframes. Further, the external circuit collectively supplies the data latch circuit 15 with the subframe data corresponding to 32 pixels belonging to the same subframe as data of the 32-bit width.

When the horizontal shift register 161 is regarded as a 1-bit serial data processing system, the horizontal shift register 161 starts shifting by the start pulse HST which is supplied from the timing generator 13 at the initial time of 1 H, and shifts the 32-bit width data, which is supplied from the data latch circuit 15, in synchronization with the clock signal HCK.

After the horizontal shift register 161 completes shifting of n bits of data corresponding to the pixel number n for one row of the image display unit 11, the latch unit 162 latches n bits of data (i.e., subframe data corresponding to n pixels) to be supplied in parallel from the horizontal shift register 161 in synchronization of the latch pulse LT supplied from the timing generator 13, and outputs the data to the level shifter of the level shifter/pixel driver 163. After the data transfer of the latch unit 162 is completed, the start pulse HST is output from the timing generator 13 again, and the horizontal shift register 161 resumes shifting of the 32-bit width data from the data latch circuit 15 in accordance with the clock signal HCK.

The level shifter of the level shifter/pixel driver 163 level-shifts the signal level of n pieces of subframe data corresponding to n pixels in one row, which are transferred from the latch unit 162, to a liquid crystal drive voltage. The pixel driver of the level shifter/pixel driver 163 outputs n pieces of subframe data corresponding to n pixels in one row after level-shifting to the n column data lines d1 to dn in parallel.

The horizontal driver 16 performs in parallel an output of subframe data for pixels of a row selected as a data write target in one horizontal scan period and a shift of the subframe data for the pixels of the row selected as the data write target in next one horizontal scan period. In a certain horizontal scanning period, the n pieces of subframe data corresponding to n pixels in one row are simultaneously output, as data signals, to the n column data lines d1 to dn in parallel.

In the plurality of pixels 12 constituting the image display unit 11, n pixels 12 in one row that are selected by the row scanning signal from the vertical shift register 14 sample n pieces of subframe data for one row, which are simultaneously output from the level shifter/pixel driver 163, through the n column data lines d1 to dn, and write the sampled data into the first data holding unit, which will be described below, in each of the pixels 12.

(Specific Configuration of Pixel 12)

Next, the specific configuration of the pixel 12 will be described.

Figure 2:
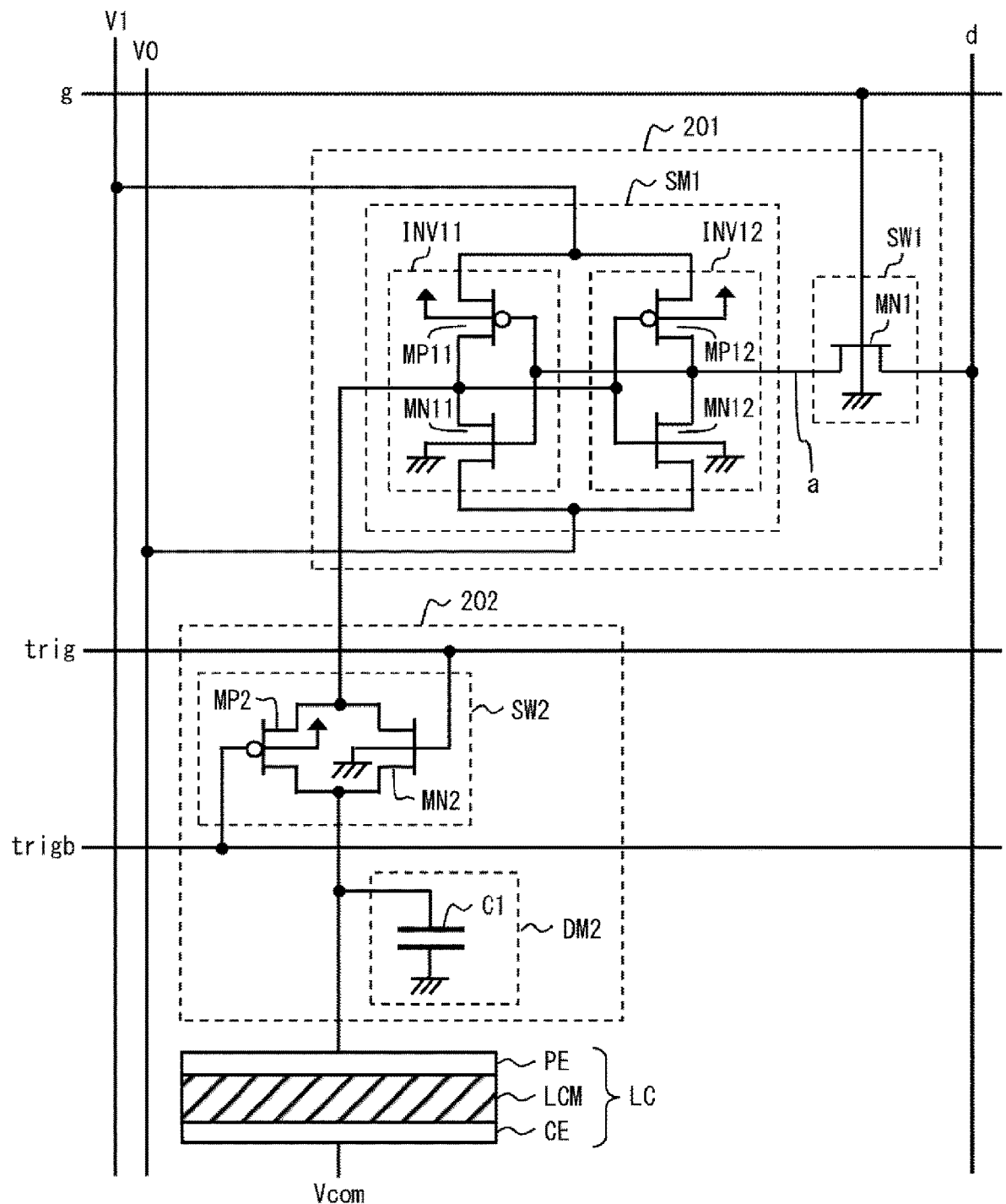
FIG. 2 is a circuit diagram showing a specific configuration of a pixel provided in the liquid crystal display device in FIG. 1.

FIG. 2 is a circuit diagram showing the specific configuration of the pixel 12.

As shown in FIG. 2, the pixel 12 is provided at an intersection portion at which any one of the row scanning lines g1 to gm (hereinafter referred to as a row scanning line g) intersects with any one of the column data lines d1 to dn (hereinafter referred to as a column data line).

The pixel 12 includes an SRAM cell 201, a DRAM cell 202, and a liquid crystal display element LC. The SRAM cell 201 includes a switch SW1 which is a first switch, and a storage unit SM1 which is a first data holding unit. The DRAM cell 202 includes a switch SW2 which is a second switch, and a storage unit DM2 which is a second data holding unit. The liquid crystal display element LC has a known structure that liquid crystal LCM is filled and encapsulated in a space between a reflecting electrode PE, which is a pixel electrode and has light reflection characteristics, and a common electrode CE which has light transmittivity and is opposed to and spaced apart from the reflecting electrode.

(Configuration of SRAM cell 201)

The switch SW1 includes, for example, an N channel MOS transistor (hereinafter referred to as an NMOS transistor) MN1. The NMOS transistor MN1 constituting the switch SW1 includes a source connected to an input terminal (node a) of the storage unit SM1, a drain connected to the column data line d, and a gate connected to the row scanning line g.

The storage unit SM1 is a self-holding memory which includes two inverters INV11 and INV12 and has a configuration in which an output terminal of one of the inverters is connected to an input terminal of the other one of the inverters. More specifically, the input terminal of the inverter INV11 is connected to the output terminal of the inverter INV12 and the source of the NMOS transistor MN1 which constitutes the switch SW1. The input terminal of the inverter INV12 is connected to the switch SW2 and the output terminal of the inverter INV11.

The inverter INV11 is a known CMOS inverter which includes a P channel MOS transistor (hereinafter referred to as a PMOS transistor) MP11 and an NMOS transistor MN11 connected in series, between a high-potential-side power supply line V1 and a low-potential-side power supply line V0, and inverts input signals supplied to their respective gates and outputs the signals from their respective drains. Similarly, the inverter INV12 is a known CMOS inverter which includes a PMOS transistor MP12 and an NMOS transistor MN12 connected in series, between a high-potential-side power supply line V1 and a low-potential-side power supply line V0, and inverts input signals supplied to their respective gates and outputs the signals from their respective drains.

Here, the respective sources of the PMOS transistors MP11 and MP12 are connected to the high-potential-side power supply line V1 separately from their wells. The respective sources of the NMOS transistors MN11 and MN12 are connected to the low-potential-side power supply line V0 separately from their wells. Each voltage of the high-potential-side power supply line V1 and the low-potential-side power supply line V0 can be arbitrarily set, for example, by a control circuit such as the host device 20 or the like.

For example, a power supply voltage VDD of 3.3 V is supplied to each of wells of the PMOS transistors MP11 and MP12 and a voltage (hereinafter referred to as a voltage V1) of 2.8 V is supplied to each of sources of the PMOS transistors MP11 and MP12 via the high-potential-side power supply line V1. Furthermore, a ground voltage GND of 0 V is supplied to each of wells of the NMOS transistors MN11 and MN12 and a voltage (hereinafter referred to as a voltage V0) of 0.5 V is supplied to each of sources of NMOS transistors MN11 and MN12 via the low-potential-side power supply line V0. For example, when data of 3.3 V is supplied to the pixels 12 via the column data line d, an amplitude of data which is latched by the storage unit SM1 is 2.3 V (=2.8 V–0.5 V). Details will be described below, 1-bit digital data of 2.3 V amplitude is applied to the reflecting electrode PE of the liquid crystal display element LC by transferring the data which is latched by the storage unit SM1 to the storage unit DM2 via the switch SW2.

Furthermore, driving capability of the inverter INV11 differs from that of inverter INV12. More specifically, among the inverters INV11 and INV12 which constitute the storage unit SM1, the driving capability of the transistors MP11 and MN11 in the inverter INV11 which is an input side seen from the switch SW1 is higher than the driving capability of the transistors MP12 and MN12 in the inverter INV12 which is an output side seen from the switch SW1. Accordingly, while data readily propagates from the column data line d to the storage unit SM1 via the switch SW1, data is less likely to propagate from the storage unit DM2 to the storage unit SM1 via the switch SW2.

Furthermore, the driving capability of the NMOS transistor MN1 which constitutes the switch SW1 is higher than the driving capability of the NMOS transistor MN12 which constitutes the inverter INV12. Accordingly, when, for example, data indicating an H-level on the column data line d is stored in the storage unit SM1, the current flowing from the column data line d to the input terminal (node a) of the storage unit SM1 via the switch SW1 can be rendered higher than the current flowing from the input terminal of the storage unit SM1 to the low-potential-side power supply line V0 via the NMOS transistor MN12, so that the voltage of node a can be increased up to a level representing H-level and it is possible to accurately store the H-level data in the storage unit SM1.

(Configuration of DRAM Cell 202)

The switch SW2 is a known transmission gate which includes an NMOS transistor MN2 and a PMOS transistor MP2 connected in parallel. More specifically, each of the NMOS transistor MN2 and the PMOS transistor MP2 includes a drain which is commonly connected to the output terminal of the storage unit SM1, and a source which is commonly connected to the input terminal of the storage unit DM2 and the reflecting electrode PE of the liquid crystal display element LC. Furthermore, a gate of the NMOS transistor MN2 is connected to the trigger line trig for the forward trigger pulse, and a gate of the PMOS transistor MP2 is connected to the trigger line trigb for the reverse trigger pulse.

For example, when the forward trigger pulse TRI supplied via the trigger line trig is at the H-level (the reverse trigger pulse TRIB supplied via the trigger line trigb is at an L-level), the switch SW2 enters an on state, and transfers data read out from the storage unit SM1 to the storage unit DM2 and the reflecting electrode PE. Furthermore, when the forward trigger pulse TRI supplied via the trigger line trig is at the L-level (the reverse trigger pulse TRIB supplied via the trigger line trigb is at the H-level), the switch SW2 enters an off state, and does not read out data stored in the storage unit SM1.

The switch SW2 is the known transmission gate, so that it is possible to transfer a wide range of voltage in the on state. More specifically, when the L-level voltage is applied from the storage unit SM1 to the drains of the transistors MN2 and MP2, while the source and the drain of the PMOS transistor MP2 do not conduct, the source and the drain of the NMOS transistor MN2 can conduct at a low resistance. On the other hand, when the H-level voltage is applied from the storage unit SM1 to the drains of the transistors MN2 and MP2, while the source and the drain of the NMOS transistor MN2 do not conduct, the source and the drain of the PMOS transistor MP2 can conduct at a low resistance. Accordingly, the source and the drain of the transmission gate can conduct at the low resistance, so that the switch SW2 can transfer the wide range of voltage in the on state.

The storage unit DM2 includes a capacitance C1. As the capacitance C1, for example, a MIM (Metal Insulation Metal) capacitance which forms a capacitance between wirings, a Diffusion capacitance which forms a capacitance between a substrate and a polysilicon, a PIP (Poly Insulator Poly) capacitance which forms a capacitance between a two-layer polysilicon, or the like can be used.

When the switch SW2 is turned on, data stored in the storage unit SM1 is read out, and is transferred to the capacitance C1 in the storage unit DM2 and the reflecting electrode PE via the switch SW2. Accordingly, the data stored in the storage unit DM2 is overwritten.

Here, in case that the data stored in the storage unit SM1 and the data stored in the storage unit DM2 are different, if the data stored in the storage unit SM1 is transferred to the storage unit DM2 via the switch SW2, the data stored in the storage unit DM2 is overwritten by the data stored in the storage unit SM1. Specifically, the capacitance C1 provided in the storage unit DM2 is charged or discharged by the output signal of inverter INV11 provided in the storage unit SM1.

For example, when the L-level data held in the capacitance C1 is overwritten to H-level data, the H-level signal is output from the inverter INV11. At this time, PMOS transistor MP11 provided in the inverter INV11 is turned on and NMOS transistor MN11 is turned off so that the capacitance C1 is charged by the voltage V1 supplied from power supply line (the high-potential-side power supply line V1 in this case) via PMOS transistor MP11.

On the other hand, when the H-level data held in the capacitance C1 is overwritten to L-level data, the L-level signal is output from the inverter INV11. At this time, the PMOS transistor MP11 provided in the inverter INV11 is turned off and the NMOS transistor MN11 is turned on so that the capacitance C1 is discharged by the voltage V0 supplied from the power supply line (the low-potential-side power supply line V0 in this case) via the NMOS transistor MN11.

The switch SW2 has an analogue switch configuration using the above-described transmission gate so that the capacitance C1 can be charged and discharged at high rate. Furthermore, as described above, the inverter INV11 is configured to have higher driving capability than the driving capability of the inverter INV12 so that the capacitance C1 can be charged and discharged at high rate.

Furthermore, when the switch SW2 is turned on, the inverter INV12 provided in the storage unit SM1 is influenced by the data held in the capacitance C1 and can be erroneously operated. However, the driving capability of the inverter INV11 is higher than the driving capability of the inverter INV12, and therefore overwriting of the data held in the capacitance C1 by the inverter INV11 has priority over the influence of the data held in the capacitance C1 on the inverter INV12. Accordingly, the data held in the capacitance C1 does not unintentionally overwrite the data of the storage unit SM1.

Thus, the liquid crystal display device 10 according to the present embodiment uses the pixels 12 which each include one SRAM cell and one DRAM cell and can consequently reduce the number of transistors which constitute pixel compared to a case where pixels including two SRAM cells are used, and can realize miniaturization of the pixels.

The present embodiment has described a case where the switch SW2 includes the PMOS transistor MP2 and the NMOS transistor MN2, but is not limited to this. The switch SW2 can be appropriately changed to a configuration provided with one of the PMOS transistor MP2 and the NMOS transistor MN2. In this case, only one of the trigger lines trig and trigb is provided.

Here, as a comparative example of the pixel 12, a pixel 52 in which a DRAM cell 501 is provided instead of the SRAM cell 201 will be considered. In the pixel 52, when the DRAM cell 501 and the DRAM cell 202 are made conductive, the electric charge accumulated in the capacitance provided in the DRAM cell 501 and the electric charge accumulated in the capacitance of the DRAM cell 202 are neutralized, and thus a wide range of voltage is difficult to be transferred from the master latch to the slave latch. On the other hand, since the pixel 12 can transfer a wide range of voltage, a wider range of voltage can be applied to the reflecting electrode of the liquid crystal display element LC.

Next, as a comparative example of the pixel 12, a pixel 62 in which a DRAM cell 501 is provided instead of the SRAM cell 201 and a SRAM cell 502 is provided instead of the DRAM cell 202 will be considered. In the pixel 62, data stored in the SRAM cell 502 needs to be overwritten by the electric charge accumulated in the capacitance provided in the DRAM cell 501. However, since the data holding ability of the SRAM cell 502 is generally higher than the charge holding ability of the capacitance, the data held in the capacitance provided in the DRAM cell 501 is unintentionally overwritten by the data stored in the SRAM cell 502. In other words, the operation of the pixel 62 becomes unstable compared to the operation of the pixel 12. When the size of the capacitance provided in the DRAM cell 501 is increased in order to eliminate the unstable operation, the pixel pitch increases. On the other hand, the pixel 12 do not have problems like those in the pixel 62.

In addition, the liquid crystal display device 10 can realize miniaturization of the pixels not only by reducing the number of transistors which constitute each pixel, but also by effectively disposing the storage units SM1 and DM2 and the reflecting electrode PE in an element height direction as described below. Details will be described below with reference to FIG. 3.

(Sectional Structure of Pixel 12)

Figure 3:
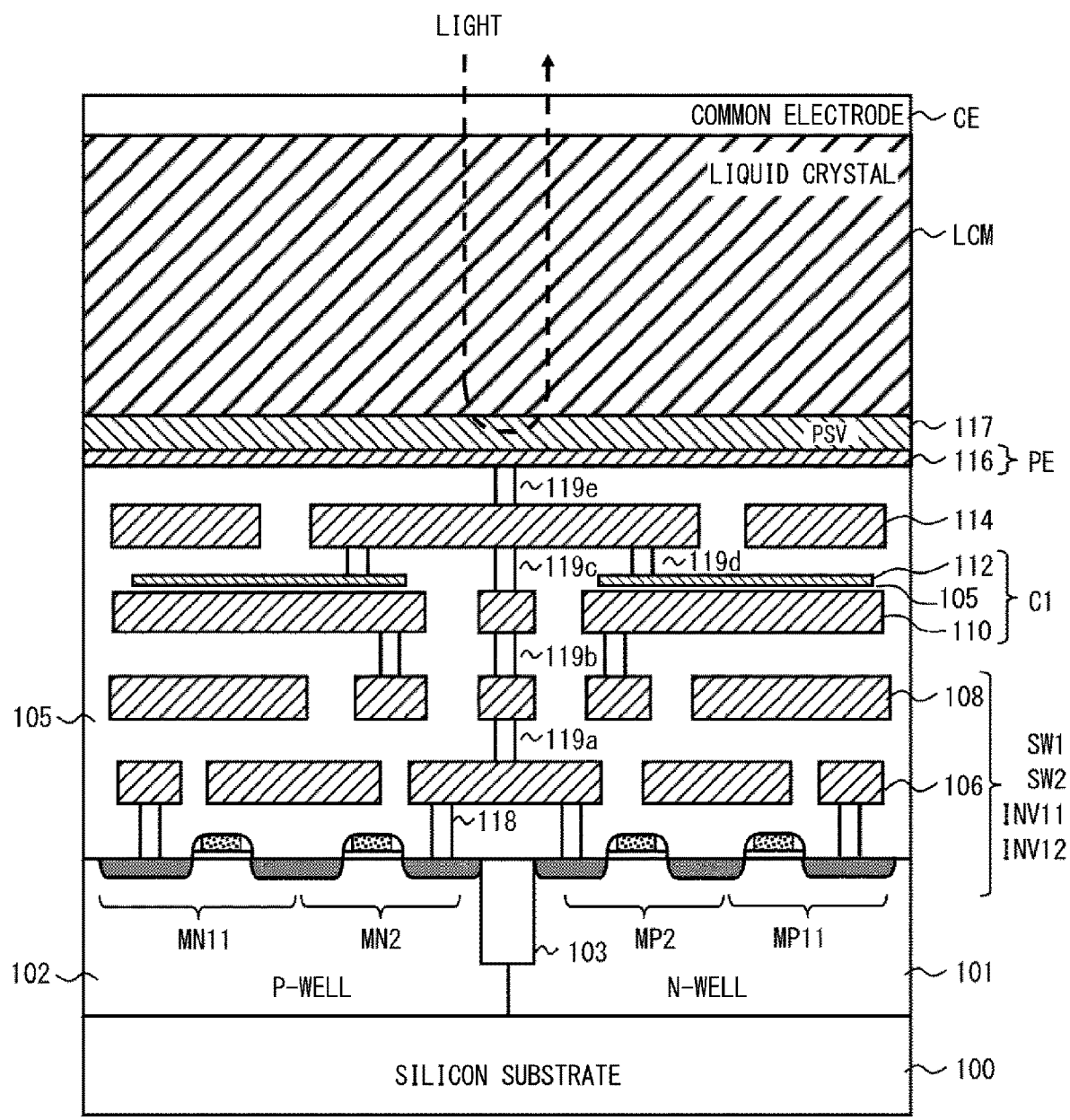
FIG. 3 is a schematic sectional view of the pixel shown in FIG. 2.

FIG. 3 is a schematic sectional view showing main units of the pixel 12. Furthermore, in the FIG. 3, a case where the capacitance C1 is constituted by the MIM which forms a capacitance between wirings will be described as an example.

As shown in FIG. 3, an N-well 101 and a P-well 102 are formed on a silicon substrate 100.

The PMOS transistor MP2 of the switch SW2 and the PMOS transistor MP11 of the inverter INV11 are formed on the N-well 101. More specifically, one common diffusion layer which is a drain of each of the PMOS transistors MP2 and MP11, and two diffusion layers which are the sources of each of the PMOS transistors MP2 and MP11 are formed on the N-well 101, and a polysilicon which is a gate of each of the PMOS transistors MP2 and MP11 is formed with a gate oxide film interposed therebetween on a channel region between the common diffusion layer and the two diffusion layers.

The NMOS transistor MN2 of the switch SW2 and the NMOS transistor MN11 of the inverter INV11 are formed on the P-well 102. More specifically, one common diffusion layer which is a drain of each of the NMOS transistors MN2 and MN11 and two diffusion layers which are sources of each the NMOS transistors MN2 and MN11 are formed on the P-well 102, and a polysilicon which is a gate of each of the NMOS transistors MN2 and MN11 is formed with a gate oxide film interposed therebetween on a channel region between the common diffusion layer and the two diffusion layers.

In addition, an element isolation oxide film 103 is formed between an active region (the diffusion layers and the channel region) on the N-well 101 and an active region on the P-well 102.

A first metal 106, a second metal 108, a third metal 110, an MIM electrode 112, a fourth metal 114 and a fifth metal 116 are laminated above the transistors MP2, MP11, MN2 and MN11 with an interlayer insulation film 105 interposed between the metals.

The fifth metal 116 forms the reflecting electrode PE which is formed in each pixel.

Each diffusion layer constituting each source of the transistors MN2 and MP2 is electrically connected to the fifth metal 116 which is the reflecting electrode PE via a contact 118, the first metal 106, a through-hole 119a, the second metal 108, a through-hole 119b, the third metal 110, a through-hole 119c, the fourth metal 114, and a through-hole 119e. Furthermore, each diffusion layer constituting each source of the transistors MN2 and MP2 is electrically connected to the MIM electrode 112 via the contact 118, the first metal 106, the through-hole 119a, the second metal 108, the through-hole 119b, the third metal 110, the through-hole 119c, the fourth metal 114, and the through-hole 119d. In other words, each source of the transistors MN2 and MP2 constituting the switch SW2 is electrically connected to the reflecting electrode PE and the MIM electrode 112.

The reflecting electrode PE (the fifth metal 116) is opposed to and spaced apart from the common electrode CE which is a transparent electrode with a passivation film (PSV) 117 interposed therebetween, the passivation film 117 being a protection film formed on an upper surface of the reflecting electrode PE. The liquid crystal LCM is filled and encapsulated in a space between the reflecting electrode PE and the common electrode CE. The liquid crystal display element LC includes the reflecting electrode PE, the common electrode CE, and the liquid crystal LCM disposed therebetween.

In this regard, the MIM electrode 112 is formed on the third metal 110 with the interlayer insulation film 105 interposed therebetween. The MIM electrode 112, third metal 110 and interlayer insulation film 105 between the MIM electrode 112 and the third metal 110 constitute the capacitance C1. Hence, while the switches SW1 and SW2 and the storage unit SM1 are formed by using the first metal 106 and the second metal 108 which are the first and second layer wirings, and the transistors, the storage unit DM2 is formed by using the third metal 110, which is a layer formed above the first and second layer wirings, and the MIM electrode 112. In other words, the layer, in which the switches SW1 and SW2 and the storage unit SM1 are formed, is different from the layer in which the storage unit DM2 is formed.

Light from a light source (not shown) is transmitted through the common electrode CE and the liquid crystal LCM, and is incident on the reflecting electrode PE (the fifth metal 116) and reflected by the reflecting electrode PE (the fifth metal 116). Then the light is returned through the original incident route and is emitted through the common electrode CE.

In this manner, the liquid crystal display device 10 uses the fifth metal 116 which is a fifth layer wiring as the reflecting electrode PE, the third metal 110 which is the third layer wiring as a part of the storage unit DM2, and uses the first metal 106 and the second metal 108 which are the first and second layers wirings, and the transistors as the storage unit SM1 or the like, so that it is possible to effectively dispose the storage unit SM1, the storage unit DM2 and the reflecting electrode PE in the height direction, and further miniaturize the pixels. Accordingly, a pixel having a pitch equal to or less than 3 μm, for example, can be formed by the transistor with a power supply voltage of 3.3 V. The use of pixels having a pitch of 3 μm or less makes it possible to achieve a liquid crystal panel having 4,000 pixels crosswise and 2,000 pixels lengthwise in a diagonal length of 0.55 inches.

(Operation of Liquid Crystal Display Device 10 According to Comparative Example)

Figure 4:
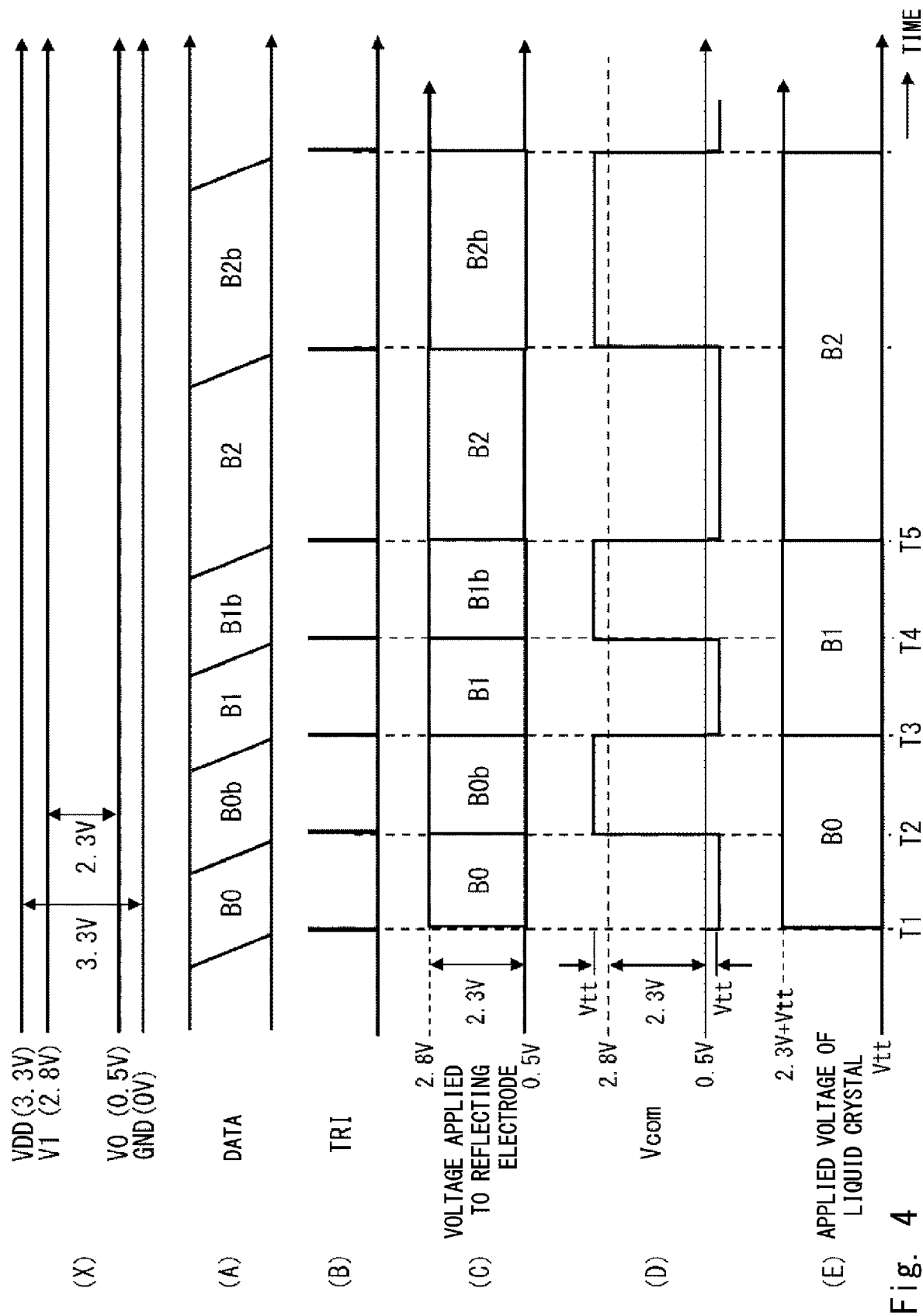
FIG. 4 is a timing chart showing an operation of a liquid crystal display device according to a comparative example.
Figure 5:
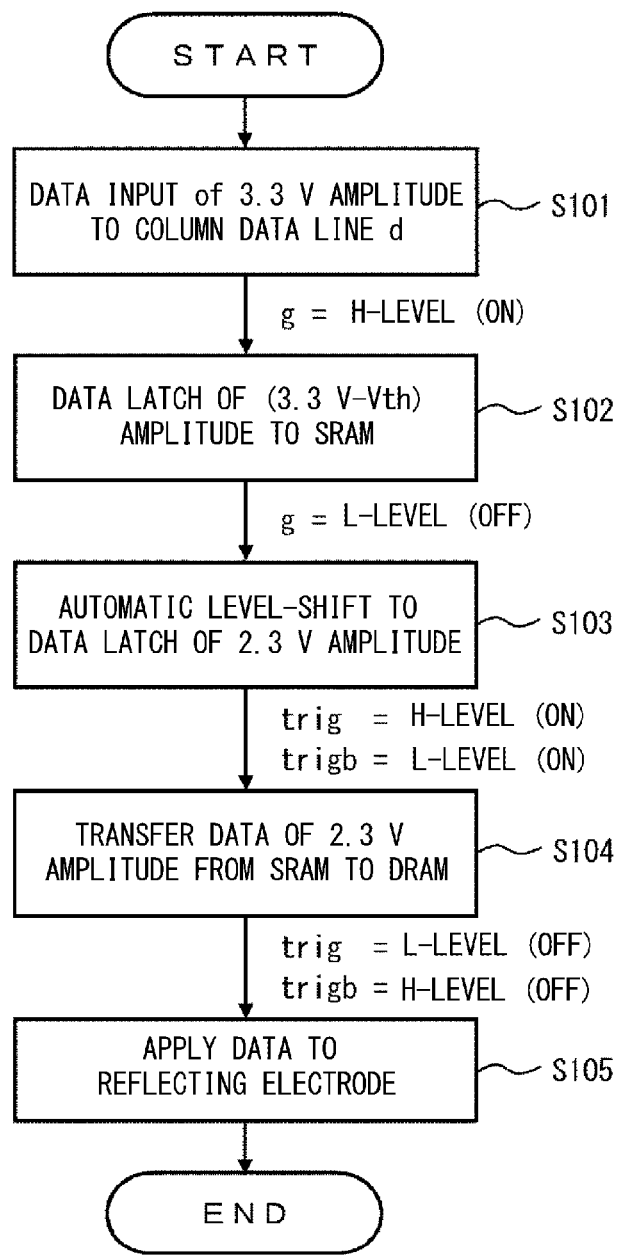
FIG. 5 is a flowchart showing the operation of the liquid crystal display device according to the comparative example.

Next, the operation of the liquid crystal display device 10 according to the comparative example will be described with reference to FIGS. 4 and 5. FIG. 4 is a timing chart showing the operation of the liquid crystal display device 10 according to the comparative example. FIG. 5 is a flowchart showing the operation of the liquid crystal display device 10 according to the comparative example.

As described above, in the liquid crystal display device 10, the row scanning lines g1 to gm are selected in turn one by one in the 1H unit according to a row scanning signal from the vertical shift register 14. Accordingly, data is written into a plurality of pixels 12, which constitute the image display unit 11, in units of n pixels in one row commonly connected to the selected row scanning line. After the data is written into all of the plurality of pixels 12 constituting the image display unit 11, the data of all the pixels 12 is simultaneously read out based on trigger pulses TRI and TRIB (more specifically, the data stored in the storage unit SM1 in all the pixels 12 is simultaneously transferred to the storage unit DM2 and the reflecting electrode PE).

FIG. 4(X) shows the voltage value of each of the power supply voltage VDD, the voltage V1, the voltage V0, and the ground voltage GND. In this example, the power supply voltage VDD is 3.3 V, the voltage V1 is 2.8 V, the voltage V0 is 0.5 V, and the ground voltage GND is 0 V. In this case, the signal amplitude of the subframe data which propagates in the column data line d is 3.3 V, the amplitudes of the gate control voltages of the respective transistors provided in the switches SW1 and SW2 are 3.3 V, the well voltages of the respective PMOS transistors are 3.3 V and the well voltages of the respective NMOS transistors are 0 V. On the other hand, the amplitudes of the data stored in storage unit SM1 are 2.3 V (=2.8 V–0.5 V), the amplitudes of the data stored in storage unit DM2 are 2.3 V.

FIG. 4(A) shows a change in subframe data stored in each pixel 12. Note that the vertical axis indicates a row number and the horizontal axis indicates time. As shown in FIG. 4(A), each boundary line between the subframe data is a downward-sloping line. This indicates that the larger the row number of a pixel is, the longer the timing of writing subframe data into the pixel is delayed. A period from one end of the boundary to the other end thereof corresponds to a subframe data write period. Note that B0b, B1b, and B2b respectively represent the inverted data of subframe data of bits B0, B1, and B2.

FIG. 4(B) shows an output timing (rise timing) of the trigger pulse TRI. Since the trigger pulse TRIB constantly indicates the logically inverted value of the trigger pulse TRI, the illustration of the trigger pulse TRIB is omitted. FIG. 4(C) schematically shows bits of subframe data to be applied to the reflecting electrode PE. FIG. 4(D) shows a change in a value of the common electrode voltage Vcom. FIG. 4(E) shows a change in a voltage to be applied to the liquid crystal LCM.

(Writing Operation of Subframe Data of Bit B0)

First, in the pixel 12 which is selected by the row scanning signal, when the switch SW1 is turned on, the forward subframe data of the bit B0, which is output from the horizontal driver 16 to the column data line d, is written into the storage unit SM1 via the switch SW1.

At this time, a signal amplitude of the subframe data which is output from the horizontal driver 16 to the column data line d is 3.3 V. An amplitude of the gate control voltage of the switch SW1 (a voltage amplitude of row scanning line g) is also 3.3 V. Accordingly, the voltage of input terminal (node a) of the storage unit SM1 is 0 V when the subframe data is L-level, and the voltage of input terminal (node a) is 2.7 V (=3.3 V–threshold voltage of 0.6 V) when the subframe data is H-level.

For example, in a case that the subframe data which propagates in the column data line d indicates H-level (3.3 V) (step S101 in FIG. 5), if the row scanning line g is H-level, the switch SW1 is turned on. Accordingly, the voltage of the input terminal (node a) of the storage unit SM1 is 2.7 V (=3.3V–threshold voltage 0.6 V) (step S102 in FIG. 5). In addition, the voltage of the high-potential-side power supply line V1 indicates 2.8 V. At this time, in the PMOS transistor MP11 provided in the storage unit SM1, the gate voltage indicates 2.7 V and the well voltage (back gate voltage) indicates 3.3 V so that the gate voltage based on the well voltage is –0.6 V. Accordingly, when the threshold voltage of the PMOS transistor MP11 is –0.6 V, the PMOS transistor MP11 is, in general, on the boundary between on and off. However, substantially, the source voltage (2.8 V) of the PMOS transistor MP11 is lower than the well voltage (3.3 V), and thus the threshold voltage of the PMOS transistor MP11 is about –0.8 V due to influence of substrate effect. Accordingly, the PMOS transistor MP11 becomes off state. On the other hand, in the NMOS transistor MN11 provided in the storage unit SM1, the source voltage indicates 0.5 V, and the gate voltage indicates 2.7 V so that the NMOS transistor MN11 becomes on state at a low resistance. Accordingly, the inverter INV11 formed with the PMOS transistor MP11 and the NMOS transistor MN11 outputs L-level signal of 0.5 V. In other words, the storage unit SM1 normally operates.

Subsequently, the row scanning line g becomes the L-level, and thus the switch SW1 is turned off. The sampled subframe data is then held in the storage unit SM1. Specifically, the inverter INV12 inverts the output signal of L-level of the inverter INV11 and outputs the H-level signal, and the inverter INV11 inverts the output signal of the H-level of the inverter INV12 and outputs the L-level signal. At this time, the voltage of node a is level-shifted from 2.7 V to 2.8 V of the voltage V1 (step S103 in FIG. 5).

Similarly, the forward subframe data of the bit B0 is written into the storage units SM1 of all the pixels 12 which constitute the image display unit 11. Accordingly, the subframe data having the amplitude of 2.3 V is held in the storage units SM1 of all the pixels 12.

Subsequently, the trigger pulse TRI of the H-level (and the trigger pulse TRIB of the L-level) is simultaneously supplied to all the pixels 12 which constitute the image display unit 11 (time T1).

Thus, the switches SW2 of all the pixels 12 are turned on, so that the forward subframe data of the bit B0, which has 2.3 V amplitude and is stored in the storage units SM1, is simultaneously transferred to the storage units DM2 and the reflecting electrode PE via the switches SW2 (step S104 in FIG. 5). Subsequently, when the switches SW2 are turned off, the transferred subframe data is held in the storage units DM2 and applied to the reflecting electrode PE at the same time (step S105 in FIG. 5). The capacitance C1 provided in the storage units DM2 can hold the analogue data, and thus hold the voltages V0 and V1 which are arbitrarily set within a range of the ground voltage GND to power supply voltage VDD.

In addition, as can be seen from FIG. 4(C), a period in which the forward subframe data of the bit B0 is held by the storage unit DM2 (a period in which the forward subframe data of the bit B0 is applied to the reflecting electrode PE) corresponds to one subframe period from a time T1 when the trigger pulse TRI becomes the H-level to a time T2 when the trigger pulse TRI becomes H-level again.

Here, when a bit value of subframe data is "1", i.e., when the subframe data is at the H-level, the voltage V1 (2.8 V in this case) is applied to the reflecting electrode PE. When the bit value is "0", i.e., when the subframe data is at the L-level, the voltage V0 (0.5 V in this case) is applied to the reflecting electrode PE. On the other hand, the voltage to be applied to the common electrode CE is not limited to the ground voltage GND, the power supply voltage VDD, and the voltage V0 and V1, and an arbitrary voltage can be applied as the common electrode voltage Vcom. The common electrode voltage Vcom is controlled to be switched to a predetermined voltage in synchronization with the input of the H-level forward trigger pulse TRI. In this example, as shown in FIG. 4(D), during the subframe period in which the forward subframe data of the bit B0 is applied to the reflecting electrode PE, the common electrode voltage Vcom is set to a voltage which is lower than 0.5 V by a threshold voltage Vtt of the liquid crystal.

The liquid crystal display element LC performs gradation display according to the voltage applied to the liquid crystal LCM which is an absolute value of a difference voltage between the voltage applied to the reflecting electrode PE and the common electrode voltage Vcom. Accordingly, as shown in FIG. 4(E), during the subframe period (from time T1 to time T2) in which the forward subframe data of the bit B0 is applied to the reflecting electrode PE, the voltage applied to the liquid crystal LCM is 2.3 V+Vtt (=2.8 V−(0.5 V−Vtt)) when the bit value of the subframe data is "1", and is Vtt (=0.5 V−(0.5 V−Vtt)) when the bit value of the subframe data is "0".

Figure 6:
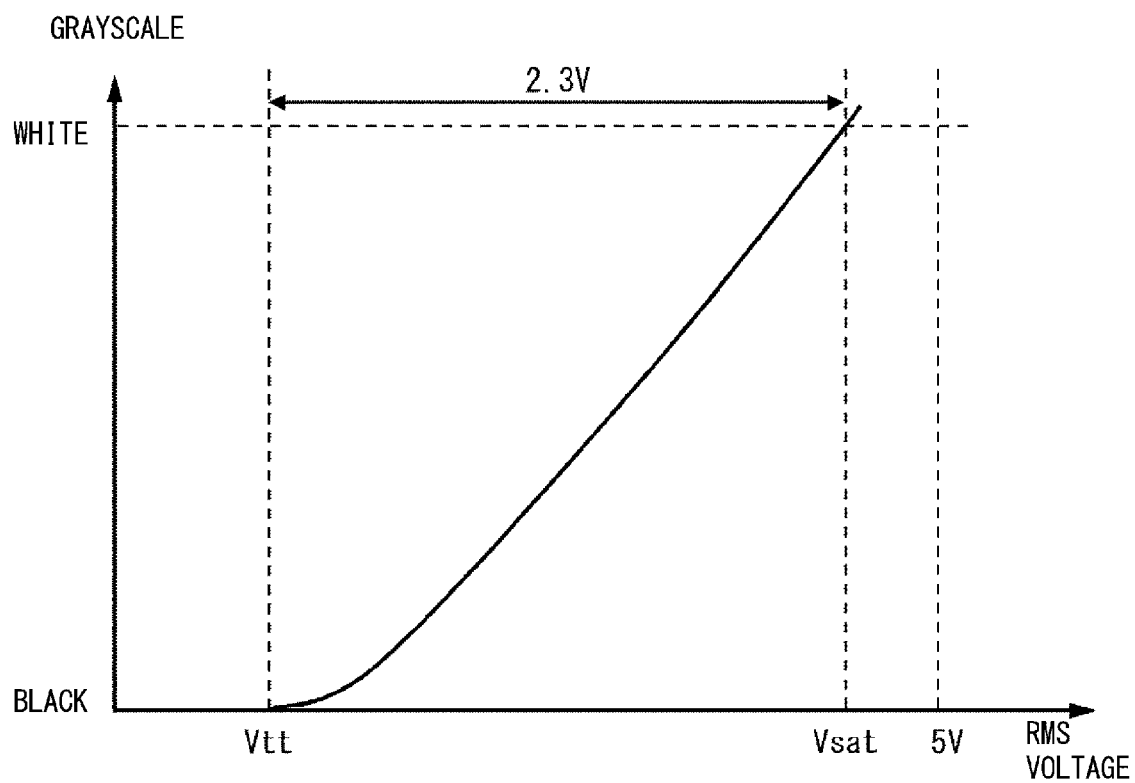
FIG. 6 is a graph showing a relationship between an applied voltage (RMS voltage) of liquid crystal and a grayscale value of liquid crystal in the liquid crystal display device according to the comparative example.

FIG. 6 shows a relationship between an applied voltage (RMS voltage) of liquid crystal and a liquid crystal grayscale value.

Referring to FIG. 6, a grayscale value curve is shifted in such a manner that a black grayscale value corresponds to the RMS voltage of the threshold voltage Vtt of the liquid crystal and a white grayscale value corresponds to the RMS voltage of a saturation voltage Vsat (=2.3 V+Vtt) of the liquid crystal. The grayscale value can be matched with an effective portion of a liquid crystal response curve. Therefore, the liquid crystal display element LC displays white when the voltage applied to the liquid crystal LCM is (2.3 V+Vtt) as described above, and displays black when the voltage applied to the liquid crystal LCM is +Vtt.

(Writing Operation of Subframe Data of Bit B0b)

Returning to FIG. 4, the description will be continued. Before the elapse of the subframe period (from time T1 to time T2) in which the liquid crystal display element LC displays the forward subframe data of the bit B0, the inverted subframe data of the bit B0 starts to be sequentially written in the storage units SM1 of all the pixels 12.

At this time, the signal amplitude of the subframe data which is output from the horizontal driver 16 to the column data line d is 3.3V. An amplitude of the gate control voltage of the switch SW1 (a voltage amplitude of row scanning line g) is also 3.3 V. Accordingly, when the subframe data is L-level, the voltage of input terminal (node a) of the storage unit SM1 is 0 V, and when the subframe data is H-level, the voltage of input terminal (node a) is 2.7 V (=3.3 V−the threshold voltage of 0.6 V).

For example, in a case that the subframe data which propagates in the column data line d indicates a H-level (3.3 V), the voltage of the input terminal (node a) of the storage unit SM1 is 2.7 V (=3.3 V−threshold voltage 0.6 V). In addition, the voltage of the high-potential-side power supply line V1 indicates 2.8 V. At this time, in the PMOS transistor MP11 provided in the storage unit SM1, the gate voltage indicates 2.7 V and the well voltage (back gate voltage) indicates 3.3 V so that the gate voltage based on the well voltage is −0.6 V. Accordingly, when the threshold voltage of the PMOS transistor MP11 is −0.6 V, the PMOS transistor MP11 is, in general, on the boundary between on and off. However, substantially, the source voltage (2.8 V) of the PMOS transistor MP11 is lower than the well voltage (3.3 V), and thus the threshold voltage of the PMOS transistor MP11 is about −0.8 V due to influence of substrate effect. Accordingly, the PMOS transistor MP11 becomes off state. On the other hand, in the NMOS transistor MN11 provided in the storage unit SM1, the source voltage indicates 0.5 V and the gate voltage indicates 2.7 V so that the NMOS transistor MN11 becomes on state at a low resistance. Accordingly, the inverter INV11 formed with the PMOS transistor MP11 and NMOS transistor MN11 outputs L-level signal of 0.5 V. In other words, the storage unit SM1 normally operates.

Subsequently, the switch SW1 is turned off, and then the sampled subframe data is held in the storage unit SM1. Specifically, the inverter INV12 inverts the L-level output signal of the inverter INV11 and outputs the H-level signal, and the inverter INV11 inverts the H-level output signal of the inverter INV12 and outputs the L-level signal. At this time, the voltage of node a is level-shifted from 2.7 V to 2.8 V of the voltage V1.

Similarly, the inverted subframe data of the bit B0 is written into the storage units SM1 of all the pixels 12 which constitute the image display unit 11. Accordingly, the subframe data having the amplitude of 2.3 V is held in the storage units SM1 of all the pixels 12.

Subsequently, the trigger pulse TRI of the H-level (and the trigger pulse TRIB of the L-level) is simultaneously supplied to all the pixels 12 which constitute the image display unit 11 (time T2).

Thus, the switches SW2 of all the pixels 12 are turned on, so that the inverted subframe data of the bit B0, which has 2.3 V amplitude and is stored in the storage units SM1, is simultaneously transferred to and held in the storage units DM2 via the switches SW2, and is applied to the reflecting electrode PE at the same time. The capacitance C1 provided in the storage units DM2 can hold the analogue data, and thus hold the voltages V0 and V1 which are arbitrarily set within a range of the ground voltage GND to power supply voltage VDD.

In addition, as can be seen from FIG. 4(C), a period of holding the inverted subframe data of the bit B0 (a period in which the inverted subframe data of the bit B0 is applied to the reflecting electrode PE) in the storage unit DM2 is one subframe period from the time T2 when the trigger pulse TRI is the H-level to a time T3 when the trigger pulse TRI becomes H-level again.

Here, since the inverted subframe data of the bit B0 and the forward subframe data of the bit B0 have the relationship of the reserve logical value at all times, the inverted subframe data of the bit B0 indicates "0" when the forward subframe data of the bit B0 is "1", the inverted subframe data of the bit B0 indicates "1" when the forward subframe data of the bit B0 is "0".

On the other hand, as shown in FIG. 4(D), during the subframe period in which the inverted subframe data of the bit B0 is applied to the reflecting electrode PE, the common electrode voltage Vcom is set to a voltage which is higher by the threshold voltage Vtt of the liquid crystal than 2.8 V. Hence, as shown in FIG. 4(E), in the subframe period (from time T2 to time T3) in which the inverted subframe data of the bit B0 is applied to the reflecting electrode PE, the voltage applied to the liquid crystal LCM is −Vtt (=2.8 V−(2.8 V+Vtt)) when the bit value of the subframe data is "1", and is −2.3 V−Vtt (=0.5 V−(2.8 V+Vtt)) when the bit value of the subframe data is "0".

For example, when the bit value of the forward subframe data of the bit B0 is "1", the bit value of the inverted subframe data of the bit B0 to be subsequently applied is "0". In this case, the voltage applied to the liquid crystal LCM is −(2.3 V+Vtt), and a potential direction becomes reverse yet the absolute value is the same compared to a case where the forward subframe data of the bit B0 is applied. Hence, even when the inverted subframe data of the bit B0 is applied, the pixel 12 displays white similar to a case where the forward subframe data of the bit B0 is applied. Furthermore, when the bit value of the forward subframe data of the bit B0 is "0", the bit value of the inverted subframe data of the bit B0 to be subsequently applied is "1". In this case, the voltage applied to the liquid crystal LCM is −Vtt, and the potential direction becomes reverse yet the absolute value is the same compared to a case where the forward subframe data of the bit B0 is applied. Hence, when the inverted subframe data of the bit B0 is applied, too, the pixel 12 displays black similar to a case where the forward subframe data of the bit B0 is applied.

Hence, as shown in FIG. 4(E), during two subframe periods from time T1 to time T3, the pixel 12 displays the same gradation as the bit B0 and the complementary bit B0$b$ of the bit B0, and performs alternating driving of reversing the potential direction of the liquid crystal LCM per subframe, so that it is possible to prevent burn-in of the liquid crystal LCM.

(Writing Operation of Subframe Data of Bit B1)

Subsequently, the forward subframe data of the bit B1 starts to be sequentially written into the storage units SM1 of all the pixels 12, before the elapse of the subframe period (from time T2 to time T3) in which the liquid display element LC displays the inverted subframe data of the bit B0.

At this time, the signal amplitude of the subframe data which is output from the horizontal driver 16 to the column data line d is 3.3 V. An amplitude of the gate control voltage of the switch SW1 (a voltage amplitude of row scanning line g) is also 3.3 V. Accordingly, the voltage of input terminal (node a) of the storage unit SM1 is 0 V when the subframe data is L-level, and the voltage of input terminal (node a) is 2.7 V (=3.3 V−threshold voltage of 0.6 V) when the subframe data is H-level.

For example, in a case that the subframe data, which propagates in the column data line d, indicates the H-level (3.3 V), the voltage of the input terminal (node a) of the storage unit SM1 is 2.7 V (=3.3V−threshold voltage 0.6 V). In addition, the voltage of the high-potential-side power supply line V1 indicates 2.8 V. At this time, in the PMOS transistor MP11 provided in the storage unit SM1, the gate voltage indicates 2.7 V and the well voltage (back gate voltage) indicates 3.3 V so that the gate voltage based on the well voltage is −0.6 V. Accordingly, when the threshold voltage of the PMOS transistor MP11 is −0.6 V, the PMOS transistor MP11 is, in general, on the boundary between on and off. However, substantially, the source voltage (2.8 V) of the PMOS transistor MP11 is lower than the well voltage (3.3 V), and thus the threshold voltage of the PMOS transistor MP11 becomes about −0.8 V due to influence of substrate effect. Accordingly, the PMOS transistor MP11 becomes off state. On the other hand, in the NMOS transistor MN11 provided in the storage unit SM1, the source voltage indicates 0.5 V, and the gate voltage indicates 2.7 V, so that the NMOS transistor MN11 becomes on state at a low resistance. Accordingly, the inverter INV11, which is formed with the PMOS transistor MP11 and the NMOS transistor MN11, outputs L-level signal of 0.5 V. In other words, the storage unit SM1 normally operates.

Subsequently, the switch SW1 is turned off, and then the sampled subframe data is held in the storage unit SM1. Specifically, the inverter INV12 inverts the L-level output signal of the inverter INV11 and outputs the H-level signal, and the inverter INV11 inverts the H-level output signal of the inverter INV12 and outputs the L-level signal. At this time, the voltage of node a is level-shifted from 2.7 V to 2.8 V of the voltage V1.

Similarly, the forward subframe data of the bit B1 is written into the storage units SM1 of all the pixels 12 which constitute the image display unit 11. Accordingly, the subframe data having the amplitude of 2.3 V is held in the storage units SM1 of all the pixels 12.

Subsequently, the trigger pulse TRI of the H-level (and the trigger pulse TRIB of the L-level) is simultaneously supplied to all the pixels 12 which constitute the image display unit 11 (time T3).

Thus, the switches SW2 of all the pixels 12 are turned on so that the inverted subframe data of the bit B1, which has 2.3 V amplitude and is stored in the storage units SM1, is simultaneously transferred to and held in the storage units DM2 via the switches SW2, and is applied to the reflecting electrode PE at the same time. The capacitance C1 provided in the storage units DM2 can hold the analogue data, and thus hold the voltages V0 and V1 which are arbitrarily set within a range of the ground voltage GND to power supply voltage VDD.

In addition, as can be seen from FIG. 4(C), a period in which the forward subframe data of the bit B1 is held by the storage unit DM2 (a period in which the forward subframe data of the bit B1 is applied to the reflecting electrode PE) corresponds to one subframe period from a time T3 when the trigger pulse TRI becomes the H-level to a time T4 when the trigger pulse TRI becomes H-level again.

On the other hand, as shown in FIG. 4(D), during the subframe period in which the forward subframe data of the bit B1 is applied to the reflecting electrode PE, the common electrode voltage Vcom is set to a voltage which is lower by the threshold voltage Vtt of the liquid crystal than 0.5 V. Hence, as shown in FIG. 4(E), in the subframe period (from time T3 to time T4) in which the forward subframe data of the bit B1 is applied to the reflecting electrode PE, the voltage applied to the liquid crystal LCM is 2.3 V+Vtt (=2.8

V−(0.5 V−Vtt)) when the bit value of the subframe data is "1", and is Vtt (=0.5 V−(0.5 V−Vtt)) when the bit value of the subframe data is "0".

(Writing Operation of Subframe Data of Bit B1b)

Subsequently, the inverted subframe data of the bit B1 starts to be sequentially written in the storage units SM1 of all the pixels 12, before the lapse of the subframe period (from time T3 to time T4) in which the liquid display element LC displays the forward subframe data of the bit B1.

At this time, the signal amplitude of the subframe data which is output from the horizontal driver 16 to the column data line d is 3.3 V. An amplitude of the gate control voltage of the switch SW1 (voltage amplitude of row scanning line g) is also 3.3 V. Accordingly, the voltage of input terminal (node a) of the storage unit SM1 is 0 V when the subframe data is L-level, and the voltage of input terminal (node a) is 2.7 V (=3.3 V−threshold voltage of 0.6 V) when the subframe data is H-level.

For example, in a case that the subframe data, which propagates in the column data line d, indicates H-level (3.3 V), the voltage of the input terminal (node a) of the storage unit SM1 is 2.7 V (=3.3V−threshold voltage 0.6 V). In addition, the voltage of the high-potential-side power supply line V1 indicates 2.8 V. At this time, in the PMOS transistor MP11 provided in the storage unit SM1, the gate voltage indicates 2.7 V and the well voltage (back gate voltage) indicates 3.3 V so that the gate voltage based on the well voltage is −0.6 V. Accordingly, when the threshold voltage of the PMOS transistor MP11 is −0.6 V, the PMOS transistor MP11 is, in general, on the boundary between on and off. However, substantially, the source voltage (2.8 V) of the PMOS transistor MP11 is lower than the well voltage (3.3 V), and thus the threshold voltage of the PMOS transistor MP11 becomes about −0.8 V due to influence of substrate effect. Accordingly, the PMOS transistor MP11 becomes off state. On the other hand, in the NMOS transistor MN11 provided in the storage unit SM1, the source voltage indicates 0.5 V, and the gate voltage indicates 2.7 V so that the NMOS transistor MN11 becomes on state at a low resistance. Accordingly, the inverter INV11, which is formed with the PMOS transistor MP11 and NMOS transistor MN11, outputs L-level signal of 0.5 V. In other words, the storage unit SM1 normally operates.

Subsequently, the switch SW1 is turned off, and then the sampled subframe data is held in the storage unit SM1. Specifically, the inverter INV12 inverts the L-level output signal of the inverter INV11 and outputs the H-level signal, and the inverter INV11 inverts the H-level output signal of the inverter INV12 and outputs the L-level signal. At this time, the voltage of node a is level-shifted from 2.7 V to 2.8 V of the voltage V1.

Similarly, the inverted subframe data of the bit B1 is written into the storage units SM1 of all the pixels 12 which constitute the image display unit 11. Accordingly, the subframe data having the amplitude of 2.3 V is held in the storage units SM1 of all the pixels 12.

Subsequently, the trigger pulse TRI of the H-level (and the trigger pulse TRIB of the L-level) is simultaneously supplied to all the pixels 12 which constitute the image display unit 11 (time T4).

Thus, the switches SW2 of all the pixels 12 are turned on so that the inverted subframe data of the bit B1, which has 2.3 V amplitude and is stored in the storage units SM1, is simultaneously transferred to and held in the storage units DM2 via the switches SW2, and is applied to the reflecting electrode PE at the same time. The capacitance C1 provided in the storage units DM2 can hold the analogue data, and thus hold the voltages V0 and V1 which are arbitrarily set within a range of the ground voltage GND to power supply voltage VDD.

In addition, as can be seen from FIG. 4(C), a period of holding the inverted subframe data of the bit B1 (a period in which the inverted subframe data of the bit B1 is applied to the reflecting electrode PE) in the storage unit DM2 is one subframe period from the time T4 when the trigger pulse TRI is the H-level to a time T5 when the trigger pulse TRI becomes H-level again.

Here, since the inverted subframe data of the bit B1 and the forward subframe data of the bit B1 have the relationship of the reserve logical value at all times, the inverted subframe data of the bit B1 indicates "0" when the forward subframe data of the bit B1 is "1", the inverted subframe data of the bit B1 indicates "1" when the forward subframe data of the bit B1 is "0".

On the other hand, as shown in FIG. 4(D), during the subframe period in which the inverted subframe data of the bit B1 is applied to the reflecting electrode PE, the common electrode voltage Vcom is set to a voltage which is higher by the threshold voltage Vtt of the liquid crystal than 2.8 V. Hence, as shown in FIG. 4(E), in the subframe period (from time T4 to time T5) in which the inverted subframe data of the bit B1 is applied to the reflecting electrode PE, the voltage applied to the liquid crystal LCM is −Vtt (=2.8 V−(2.8 V+Vtt)) when the bit value of the subframe data is "1", and is −2.3 V−Vtt (=0.5 V−(2.8 V+Vtt)) when the bit value of the subframe data is "0".

Consequently, as shown in FIG. 4(E), during the two subframe periods of the times T3 to T5, the pixel 12 displays the same gradation as the bit B1 and the complementary bit B1b of the bit B1, and performs alternating driving of reversing the potential direction of the liquid crystal LCM per subframe, so that it is possible to prevent burn-in of the liquid crystal LCM. The same operation is also repeatedly performed on the bit B2 and subsequent bits.

In this way, the liquid crystal display device 10 displays the gradation in a combination of a plurality of subframes.

In addition, each display period of the bit B0 and the complementary bit B0b is the same first subframe period, and, furthermore, each display period of the bit B1 and the complementary bit B1b is also the same second subframe period. However, the first subframe period and the second subframe period are not necessarily the same period. In this regard, as shown in FIG. 4(E), a certain pair of two subframe periods is set to twice the immediately preceding pair of two subframe periods. The duration of each subframe period and the number of subframes can be optionally set according to a system specification or the like.

However, in the operation of the liquid crystal display device 10 according to the comparative example, when a time required to write the subframe into all the pixels 12 increases as the number of pixels increases, an interval between a time when the subframe data is applied to the reflecting electrode PE of all the pixels 12 and a time when the next subframe data is applied becomes long. In other words, the period during which one subframe data is applied to the reflecting electrode PE of all the pixels 12 (a subframe period) is rate-controlled by the time required to write the subframe data into all the pixels 12, and becomes longer. In the example in FIG. 4, the subframe period of the minimum bit (from time T1 to time T3) is not sufficiently shortened. Therefore, in the operation of the liquid crystal display device 10 according to the comparative example, the number of subframes insertable in one frame period is limited, and the number of gradations can hardly be increased. As a result, image quality may be deteriorated.

Accordingly, even when the time required to write the subframe data into all the pixels 12 increases with the increase in the number of pixels, a desired subframe period can be secured, and as a result, the liquid crystal display device 10 and the driving method therefor capable of improving the image quality have been found. The details will be described below.

(Operation of Liquid Crystal Display Device 10 according to First Embodiment)

Figure 7:
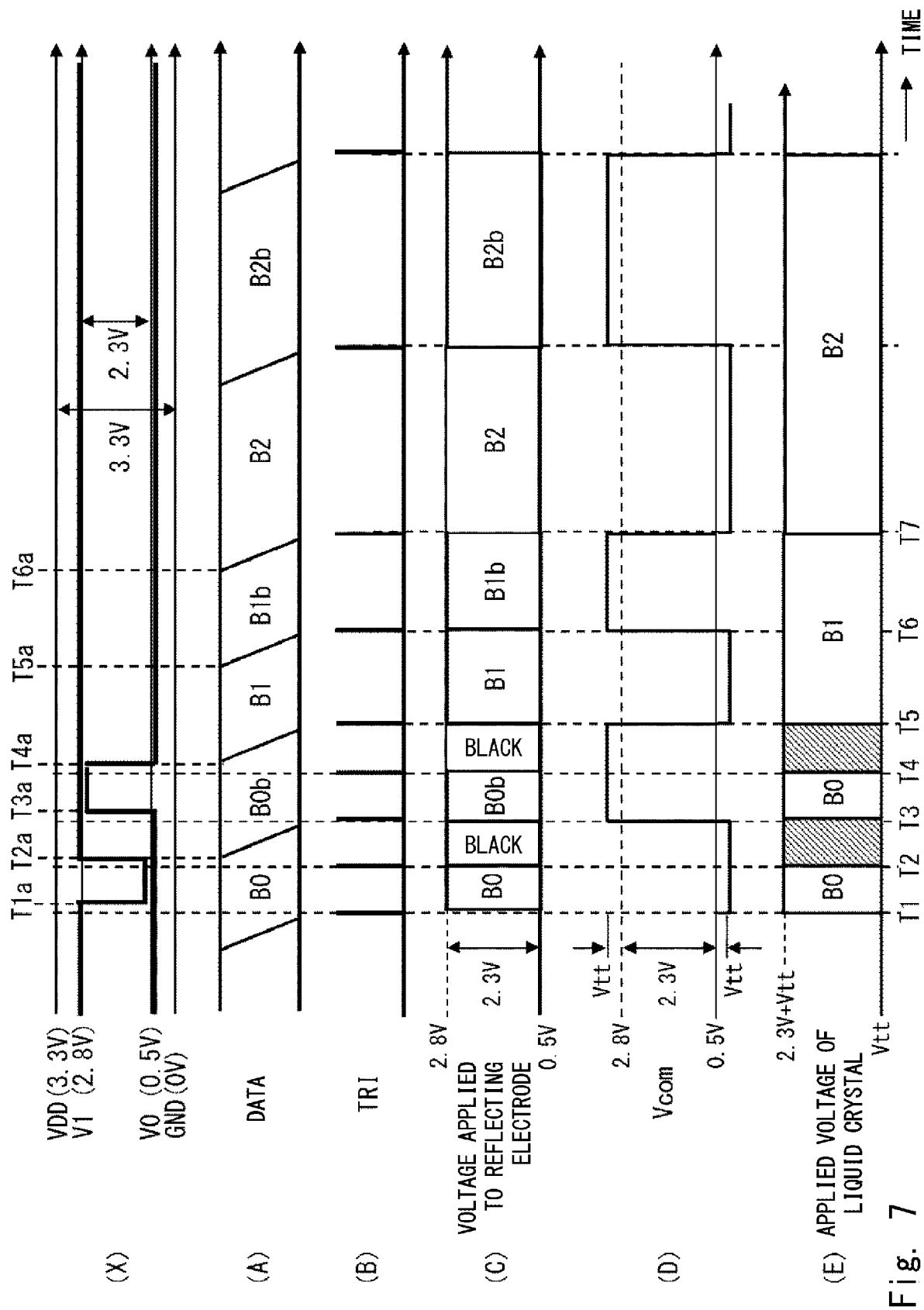
FIG. 7 is a timing chart showing an operation of the liquid crystal display device according to first embodiment.
Figure 8:
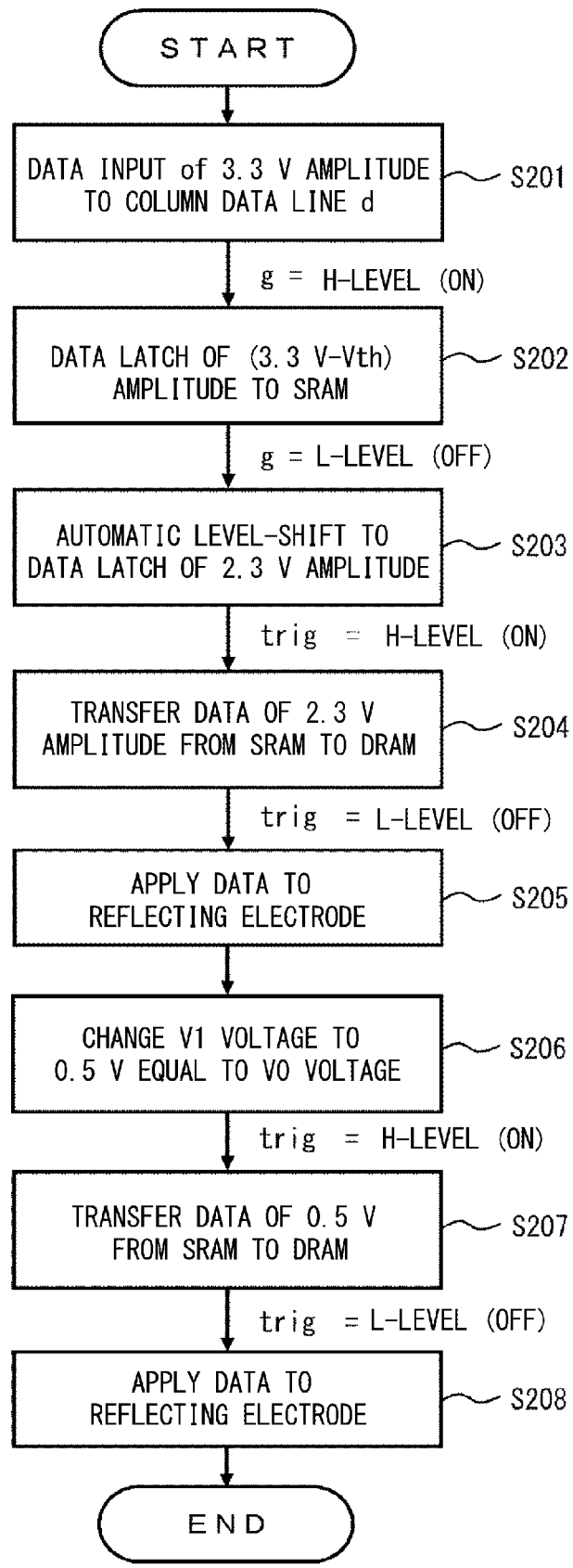
FIG. 8 is a flowchart showing the operation of the liquid crystal display device according to first embodiment.

FIG. 7 is the timing chart showing an operation of the liquid crystal display device 10 according to the first embodiment. FIG. 8 is the flowchart showing an operation of the liquid crystal display device 10 according to the first embodiment.

Furthermore, in this embodiment, the timing generator 13 is configured to be able to supply an arbitrary pulse-shaped voltage to high-potential-side power supply line V1 and low-potential-side power supply line V0 by, for example, receiving an instruction from the host device 20.

Here, as described above, the high-potential-side power supply line V1 is connected to the source of each of the PMOS transistors MP11 and MP12 provided in the storage unit SM1. The low-potential-side power supply line V0 is connected to the source of each of the NMOS transistors MN11 and MN12 provided in the storage unit SM1. Accordingly, the voltage of the high-potential-side power supply line V1 (voltage V1) becomes the H-level in each pixel 12 and the voltage of the low-potential-side power supply line V0 (voltage V0) becomes the L-level in each pixel 12.

As described above, in the liquid crystal display device 10, the row scanning lines g1 to gm are selected in turn one by one in the 1H unit according to a row scanning signal from the vertical shift register 14. Accordingly, data is written into a plurality of pixels 12, which constitute the image display unit 11, in units of n pixels in one row commonly connected to the selected row scanning line. After the data is written into all of the plurality of pixels 12 constituting the image display unit 11, the data of all the pixels 12 is simultaneously read out based on trigger pulses TRI and TRIB (more specifically, the data stored in the storage unit SM1 in all the pixels 12 is simultaneously transferred to the storage unit DM2 and the reflecting electrode PE).

FIG. 7(X) shows the voltage value of each of the power supply voltage VDD, the voltage V1, the voltage V0, and the ground voltage GND. In this example, the power supply voltage VDD is 3.3 V, the voltage V1 is 2.8 V, the voltage V0 is 0.5 V, and the ground voltage GND is 0 V. In this case, the signal amplitude of the subframe data which propagates in the column data line d is 3.3 V, the amplitudes of the gate control voltages of the respective transistors provided in the switches SW1 and SW2 are 3.3 V, the well voltages of the respective PMOS transistors are 3.3 V and the well voltages of the respective NMOS transistors are 0 V. On the other hand, the amplitudes of the data stored in storage unit SM1 are 2.3 V (=2.8V−0.5 V) and the amplitudes of the data stored in storage unit DM2 are 2.3 V.

FIG. 7(A) shows a change in subframe data stored in each pixel 12. Note that the vertical axis indicates a row number and the horizontal axis indicates time. As shown in FIG. 7(A), each boundary line between the subframe data is a downward-sloping line. This indicates that the larger the row number is, the longer the timing of writing subframe data into the pixel is delayed. A period from one end of the boundary to the other end thereof corresponds to a subframe data write period. Note that B0b, B1b, and B2b respectively represent the inverted data of subframe data of bits B0, B1, and B2.

FIG. 7(B) shows an output timing (rise timing) of the trigger pulse TRI. Since the trigger pulse TRIB constantly indicates the logically inverted value of the trigger pulse TRI, the illustration of the trigger pulse TRIB is omitted. FIG. 7(C) schematically shows bits of subframe data to be applied to the reflecting electrode PE. FIG. 7(D) shows a change in a value of the common electrode voltage Vcom. FIG. 7(E) shows a change in a voltage to be applied to the liquid crystal LCM.

(Writing Operation of Subframe Data of Bit B0)

First, in the pixel 12 which is selected by the row scanning signal, when the switch SW1 is turned on, the forward subframe data of the bit B0, which is output from the horizontal driver 16 to the column data line d, is written in the storage unit SM1 via the switch SW1.

At this time, a signal amplitude of the subframe data which is output from the horizontal driver 16 to the column data line d is 3.3 V. An amplitude of the gate control voltage of the switch SW1 (a voltage amplitude of row scanning line g) is also 3.3 V. Accordingly, the voltage of input terminal (node a) of the storage unit SM1 is 0 V when the subframe data is L-level, and the voltage of input terminal (node a) is 2.7 V (=3.3 V−threshold voltage of 0.6 V) when the subframe data is H-level.

For example, in a case that the subframe data which propagates in the column data line d indicates H-level (3.3 V) (step S201 in FIG. 8), if the row scanning line g is H-level, the switch SW1 is turned on. Accordingly, the voltage of the input terminal (node a) of the storage unit SM1 is 2.7 V (=3.3 V−threshold voltage of 0.6 V) (step S202 in FIG. 8). In addition, the voltage of the high-potential-side power supply line V1 indicates 2.8 V. At this time, in the PMOS transistor MP11 provided in the storage unit SM1, the gate voltage indicates 2.7 V and the well voltage (back gate voltage) indicates 3.3 V so that the gate voltage based on the well voltage is −0.6 V. Accordingly, when the threshold voltage of the PMOS transistor MP11 is −0.6 V, the PMOS transistor MP11 is, in general, on the boundary between on and off. However, substantially, the source voltage (2.8 V) of the PMOS transistor MP11 is lower than the well voltage (3.3 V), and thus the threshold voltage of the PMOS transistor MP11 is about −0.8 V due to influence of substrate effect. Accordingly, the PMOS transistor MP11 becomes off state. On the other hand, in the NMOS transistor MN11 provided in the storage unit SM1, the source voltage indicates 0.5 V, and the gate voltage indicates 2.7 V so that the NMOS transistor MN11 becomes on state at a low resistance. Accordingly, the inverter INV11 formed with the PMOS transistor MP11 and NMOS transistor MN11 outputs L-level signal of 0.5 V. In other words, the storage unit SM1 normally operates.

Subsequently, the row scanning line g becomes the L-level, and thus the switch SW1 becomes off. The sampled subframe data is then held in the storage unit SM1. Specifically, the inverter INV12 inverts the output signal of L-level of the inverter INV11 and outputs the H-level signal, and the inverter INV11 inverts the output signal of the H-level of the inverter INV12 and outputs the L-level signal. At this time, the voltage of node a is level-shifted from 2.7 V to 2.8 V of the voltage V1 (step S203 in FIG. 8).

Similarly, the forward subframe data of the bit B0 is written into the storage units SM1 of all the pixels 12 which constitute the image display unit 11. Accordingly, the subframe data having the amplitude of 2.3 V is held in the storage units SM1 of all the pixels 12.

Subsequently, the trigger pulse TRI of the H-level (and the trigger pulse TRIB of the L-level) is simultaneously supplied to all the pixels 12 which constitute the image display unit 11 (time T1).

Thus, the switches SW2 of all the pixels 12 are turned on, so that the forward subframe data of the bit B0, which has 2.3 V amplitude and is stored in the storage units SM1, is simultaneously transferred to the storage units DM2 and the reflecting electrode PE via the switches SW2 (step S204 in FIG. 8). Subsequently, when the switches SW2 are turned off, the transferred subframe data are held in the storage units DM2 and applied to the reflecting electrode PE at the same time (step S205 in FIG. 8). The capacitance C1 provided in the storage units DM2 can hold the analogue data, and thus hold the voltages V0 and V1 which are arbitrarily set within a range of the ground voltage GND to power supply voltage VDD.

In addition, as can be seen from FIG. 7(C), a period in which the forward subframe data of the bit B0 is held by the storage unit DM2 (a period in which the forward subframe data of the bit B0 is applied to the reflecting electrode PE) corresponds to one subframe period from a time T1 when the trigger pulse TRI becomes the H-level to a time T2 when the trigger pulse TRI becomes H-level again.

Here, when a bit value of subframe data is "1", i.e., when the subframe data is at the H-level, the voltage V1 (2.8 V in this case) is applied to the reflecting electrode PE. When the bit value is "0", i.e., when the subframe data is at the L-level, the voltage V0 (0.5 V in this case) is applied to the reflecting electrode PE. On the other hand, the voltage to be applied to the common electrode CE is not limited to the ground voltage GND, the power supply voltage VDD, and the voltage V0 and V1, and an arbitrary voltage can be applied as the common electrode voltage Vcom. The common electrode voltage Vcom is controlled to be switched to a predetermined voltage in synchronization with the input of the H-level forward trigger pulse TRI. In this example, as shown in FIG. 7(D), during the subframe period in which the forward subframe data of the bit B0 is applied to the reflecting electrode PE, the common electrode voltage Vcom is set to a voltage which is lower than 0.5 V by a threshold voltage Vtt of the liquid crystal.

The liquid crystal display element LC performs gradation display according to the voltage differential voltage to the liquid crystal LCM which is an absolute value of a difference voltage between the voltage applied to the reflecting electrode PE and the common electrode voltage Vcom. Accordingly, as shown in FIG. 7(E), during the subframe period (from time T1 to time T2) in which the forward subframe data of the bit B0 is applied to the reflecting electrode PE, the voltage applied to the liquid crystal LCM is 2.3 V+Vtt (=2.8 V−(0.5 V−Vtt)) when the bit value of the subframe data is "1", and is Vtt (=0.5 V−(0.5 V−Vtt)) when the bit value of the subframe data is "0". In addition, as described above, the liquid crystal display element LC displays white when the voltage applied to the liquid crystal LCM is (2.3 V+Vtt), and displays black when the voltage applied to the liquid crystal LCM is +Vtt.

At an arbitrary time T1a within the period in which the liquid crystal display element LC displays the forward subframe data of the bit B0 (from time T1 to time T2), the voltage V1 is changed from 2.8 V to 0.5 V equal to the voltage V0 using a timing generator 13 or the like(step S206 in FIG. 8). Accordingly, in each of the pixels 12, the source of each of the PMOS transistors MP11 and MP12 provided in the storage unit SM1 is supplied with the voltage V1 of 0.5 V, and the source of each of the NMOS transistors MN11 and MN12 provided in the storage unit SM1 is supplied with the voltage V0 of 0.5 V. Thus, the data of 0.5 V is held by the storage unit SM1 of all the pixels 12 (time T1a).

Note that the time T1a at which the voltage V1 is changed from 2.8 V to 0.5 V equal to the voltage V0 needs to be determined in consideration of the rounding of the waveform due to the resistance and capacitance of the high-potential-side power supply line V1.

Subsequently, the trigger pulse TRI of the H-level (and the trigger pulse TRIB of the L-level) is simultaneously supplied to all the pixels 12 which constitute the image display unit 11 (time T2).

Thus, the switches SW2 of all the pixels 12 are turned on, so that the 0.5 V subframe data stored in the storage units SM1 is simultaneously transferred to the storage units DM2 and the reflecting electrode PE via the switches SW2 (step S207 in FIG. 8). Subsequently, when the switches SW2 are turned off, the 0.5 V subframe data is held in the storage units DM2 and applied to the reflecting electrode PE at the same time (step S208 in FIG. 8). The capacitance C1 provided in the storage units DM2 can hold the analogue data, and thus hold the voltage (0.5 V in this case) which are arbitrarily set within a range of the ground voltage GND to power supply voltage VDD.

In addition, as can be seen from FIG. 7(C), a period of holding the 0.5 V voltage (a period in which the 0.5 V voltage is applied to the reflecting electrode PE) in the storage unit DM2 is a period from a time T2 when the trigger pulse TRI is the H-level, to a time T3 when the trigger pulse TRI becomes H-level again.

The display period of the forward subframe data of the bit B0, which is the minimum bit, is from time T1 to time T3, but since the data of the black display level is forcibly displayed during the period from time T2 to time T3, the actual display period is shortened to the period from time T1 to time T2. In the period from time T1 to time T2, when the bit value of subframe data is "1", i.e., when the subframe data is at the H-level, the voltage V1 (2.8 V in this case) is applied to the reflecting electrode PE. When the bit value is "0", i.e., when the subframe data is at the L-level, the voltage V0 (0.5 V in this case) is applied to the reflecting electrode PE.

On the other hand, the voltage to be applied to the common electrode CE is not limited to the ground voltage GND, the power supply voltage VDD, and the voltage V0 and V1, and an arbitrary voltage can be applied as the common electrode voltage Vcom. The common electrode voltage Vcom is controlled to be switched to a predetermined voltage in synchronization with the input of the H-level forward trigger pulse TRI. In this example, as shown in FIG. 7(D), during the subframe period in which the forward subframe data of the bit B0 is applied to the reflecting electrode PE, the common electrode voltage Vcom is set to a voltage which is lower than 0.5 V by a threshold voltage Vtt of the liquid crystal.

(Writing Operation of Subframe Data of Bit B0b)

In all the pixels 12, after the subframe data of black display level is transferred from the storage unit SM1 to the storage unit DM2 and the reflecting electrode PE (time T2), the writing of the inverted subframe data of the bit B0 into the storage unit SM1 of all the pixels 12 is sequentially started at an arbitrary timing before the elapse of the period (time T3) during the forward subframe data of black display level is displayed by the liquid crystal display element LC (time T2a).

The voltage V1 is set to be returned from 0.5 V to 2.8 V during a period from time T2 to time T2a. Note that the timing at which the voltage V1 is changed from 0.5 V to 2.8 V needs to be determined in consideration of the rounding of the waveform due to the resistance and capacitance of the high-potential-side power supply line V1.

At this time, the signal amplitude of the subframe data which is output from the horizontal driver 16 to the column data line d is 3.3 V. An amplitude of the gate control voltage of the switch SW1 (voltage amplitude of row scanning line g) is also 3.3 V. Accordingly, the voltage of input terminal (node a) of the storage unit SM1 is 0 V when the subframe data is L-level, and the voltage of input terminal (node a) is 2.7 V (=3.3 V−threshold voltage of 0.6 V) when the subframe data is H-level.

For example, in a case that the subframe data, which propagates in the column data line d, indicates H-level (3.3 V), the voltage of the input terminal (node a) of the storage unit SM1 is 2.7 V (=3.3 V−threshold voltage 0.6 V). In addition, the voltage of the high-potential-side power supply line V1 indicates 2.8 V. At this time, in the PMOS transistor MP11 provided in the storage unit SM1, the gate voltage indicates 2.7 V and the well voltage (back gate voltage) indicates 3.3 V so that the gate voltage based on the well voltage is −0.6 V. Accordingly, when the threshold voltage of the PMOS transistor MP11 is −0.6 V, the PMOS transistor MP11 is, in general, on the boundary between on and off. However, substantially, the source voltage (2.8 V) of the PMOS transistor MP11 is lower than the well voltage (3.3 V), and thus the threshold voltage of the PMOS transistor MP11 becomes about −0.8 V due to influence of substrate effect. Accordingly, the PMOS transistor MP11 becomes off state. On the other hand, in the NMOS transistor MN11 provided in the storage unit SM1, the source voltage indicates 0.5 V, and the gate voltage indicates 2.7 V so that the NMOS transistor MN11 becomes on state at a low resistance. Accordingly, the inverter INV11, which is formed with the PMOS transistor MP11 and NMOS transistor MN11, outputs L-level signal of 0.5 V. In other words, the storage unit SM1 normally operates.

Subsequently, the switch SW1 is turned off, and then the sampled subframe data is held in the storage unit SM1. Specifically, the inverter INV12 inverts the L-level output signal of the inverter INV11 and outputs the H-level signal, and the inverter INV11 inverts the H-level output signal of the inverter INV12 and outputs the L-level signal. At this time, the voltage of node a is level-shifted from 2.7 V to 2.8 V of the voltage V1.

Similarly, the inverted subframe data of the bit B0 is written into the storage units SM1 of all the pixels 12 which constitute the image display unit 11. Accordingly, the subframe data having the amplitude of 2.3 V is held in the storage units SM1 of all the pixels 12.

Subsequently, the trigger pulse TRI of the H-level (and the trigger pulse TRIB of the L-level) is simultaneously supplied to all the pixels 12 which constitute the image display unit 11 (time T3).

Thus, the switches SW2 of all the pixels 12 are turned on so that the inverted subframe data of the bit B0, which has 2.3 V amplitude and is stored in the storage units SM1, is simultaneously transferred to and held in the storage units DM2 via the switches SW2, and is applied to the reflecting electrode PE at the same time. The capacitance C1 provided in the storage units DM2 can hold the analogue data, and thus hold the voltages V0 and V1 which are arbitrarily set within a range of the ground voltage GND to power supply voltage VDD.

In addition, as can be seen from FIG. 7(C), a period of holding the inverted subframe data of the bit B0 (a period in which the inverted subframe data of the bit B0 is applied to the reflecting electrode PE) in the storage unit DM2 is one subframe period from the time T3 when the trigger pulse TRI is the H-level to a time T4 when the trigger pulse TRI becomes H-level again.

Here, since the inverted subframe data of the bit B0 and the forward subframe data of the bit B0 have the relationship of the reserve logical value at all times, the inverted subframe data of the bit B0 indicates "0" when the forward subframe data of the bit B0 is "1", the inverted subframe data of the bit B0 indicates "1" when the forward subframe data of the bit B0 is "0".

On the other hand, as shown in FIG. 7(D), during the subframe period in which the inverted subframe data of the bit B0 is applied to the reflecting electrode PE, the common electrode voltage Vcom is set to a voltage which is higher by the threshold voltage Vtt of the liquid crystal than 2.8 V. Hence, as shown in FIG. 7(E), in the subframe period (from time T3 to time T4) in which the inverted subframe data of the bit B0 is applied to the reflecting electrode PE, the voltage applied to the liquid crystal LCM is −Vtt (=2.8 V−(2.8 V+Vtt)) when the bit value of the subframe data is "1", and is −2.3 V−Vtt (=0.5 V−(2.8 V+Vtt)) when the bit value of the subframe data is "0".

For example, when the bit value of the forward subframe data of the bit B0 is "1", the bit value of the inverted subframe data of the bit B0 to be subsequently applied is "0". In this case, the voltage applied to the liquid crystal LCM is −(2.3 V+Vtt), and a potential direction becomes reverse yet the absolute value is the same compared to a case where the forward subframe data of the bit B0 is applied. Hence, even when the inverted subframe data of the bit B0 is applied, the pixel 12 displays white similar to a case where the forward subframe data of the bit B0 is applied. Furthermore, when the bit value of the forward subframe data of the bit B0 is "0", the bit value of the inverted subframe data of the bit B0 to be subsequently applied is "1". In this case, the voltage applied to the liquid crystal LCM is −Vtt, and the potential direction becomes reverse yet the absolute value is the same compared to a case where the forward subframe data of the bit B0 is applied. Hence, when the inverted subframe data of the bit B0 is applied, too, the pixel 12 displays black similar to a case where the forward subframe data of the bit B0 is applied.

At an arbitrary time T3a within the period in which the liquid crystal display element LC displays the forward subframe data of the bit B0 (from time T3 to time T4), the voltage V0 is changed from 0.5 V to 2.8 V equal to the voltage V1 using a timing generator 13 or the like. Accordingly, in each of the pixels 12, the source of each of the PMOS transistors MP11 and MP12 provided in the storage unit SM1 is supplied with the voltage V1 of 2.8 V, and the source of each of the NMOS transistors MN11 and MN12 provided in the storage unit SM1 is supplied with the voltage V0 of 2.8 V. Thus, the data of 0.5 V is held by the storage unit SM1 of all the pixels 12 (time T3a).

Note that the time T3a at which the voltage V0 is changed from 0.5 V to 2.8 V equal to the voltage V1 needs to be determined in consideration of the rounding of the waveform due to the resistance and capacitance of the high-potential-side power supply line V0.

Subsequently, the trigger pulse TRI of the H-level (and the trigger pulse TRIB of the L-level) is simultaneously supplied to all the pixels 12 which constitute the image display unit 11 (time T4).

Thus, the switches SW2 of all the pixels 12 are turned on, so that the 2.8 V subframe data stored in the storage units SM1 is simultaneously transferred to and held in the storage units DM2 via the switches SW2, and is applied to the reflecting electrode PE at the same time. The capacitance C1 provided in the storage units DM2 can hold the analogue data, and thus hold the voltage (2.8 V in this case) which are arbitrarily set within a range of the ground voltage GND to power supply voltage VDD.

In addition, as can be seen from FIG. 7(C), a period of holding the 2.8 V voltage (a period in which the 2.8 V voltage is applied to the reflecting electrode PE) in the storage unit DM2 is a period from a time T4 when the trigger pulse TRI is the H-level to a time T5 when the trigger pulse TRI becomes H-level again.

The display period of the inverted subframe data of the bit B0, which is the minimum bit, is from time T3 to time T5, but since the data of the black display level is forcibly displayed during the period from time T4 to time T5, the actual display period is shortened to the period from time T3 to time T4. In the period from time T3 to time T4, when the bit value of subframe data is "1", i.e., when the subframe data is at the H-level, the voltage V1 (2.8 V in this case) is applied to the reflecting electrode PE. When the bit value is "0", i.e., when the subframe data is at the L-level, the voltage V0 (0.5 V in this case) is applied to the reflecting electrode PE.

On the other hand, the voltage to be applied to the common electrode CE is not limited to the ground voltage GND, the power supply voltage VDD, and the voltage V0 and V1, and an arbitrary voltage can be applied as the common electrode voltage Vcom. The common electrode voltage Vcom is controlled to be switched to a predetermined voltage in synchronization with the input of the H-level forward trigger pulse TRI. In this example, as shown in FIG. 7(D), during the subframe period in which the inverted subframe data of the bit B0 is applied to the reflecting electrode PE, the common electrode voltage Vcom is set to a voltage which is higher than 2.8 V by a threshold voltage Vtt of the liquid crystal.

Hence, as shown in FIG. 7(E), during two subframe periods of the times T1 to T5, the pixel 12 displays the same gradation as the bit B0 and the complementary bit B0b of the bit B0, and performs alternating driving of reversing the potential direction of the liquid crystal LCM per subframe, so that it is possible to prevent burn-in of the liquid crystal LCM.

(Writing Operation of Subframe Data of Bit B1)

In all the pixels 12, after the subframe data of black display level is transferred from the storage unit SM1 to the storage unit DM2 and the reflecting electrode PE (time T4), the writing of the forward subframe data of the bit B1 into the storage unit SM1 of all the pixels 12 is sequentially started at an arbitrary timing before the elapse of the period (time T5) during the inverted subframe data of black display level is displayed by the liquid crystal display element LC (time T4a).

The voltage V0 is set to be returned from 2.8 V to 0.5 V during a period from time T4 to time T4a. Note that the timing at which the voltage V0 is changed from 2.8 V to 0.5 V needs to be determined in consideration of the rounding of the waveform due to the resistance and capacitance of the high-potential-side power supply line V0.

At this time, the signal amplitude of the subframe data which is output from the horizontal driver 16 to the column data line d is 3.3 V. An amplitude of the gate control voltage of the switch SW1 (voltage amplitude of row scanning line g) is also 3.3 V. Accordingly, the voltage of input terminal (node a) of the storage unit SM1 is 0 V when the subframe data is L-level, and the voltage of input terminal (node a) is 2.7 V (=3.3 V−threshold voltage of 0.6 V) when the subframe data is H-level.

For example, in a case that the subframe data, which propagates in the column data line d, indicates H-level (3.3 V), the voltage of the input terminal (node a) of the storage unit SM1 is 2.7 V (=3.3V−threshold voltage 0.6 V). In addition, the voltage of the high-potential-side power supply line V1 indicates 2.8 V. At this time, in the PMOS transistor MP11 provided in the storage unit SM1, the gate voltage indicates 2.7 V and the well voltage (back gate voltage) indicates 3.3 V so that the gate voltage based on the well voltage is −0.6 V. Accordingly, when the threshold voltage of the PMOS transistor MP11 is −0.6 V, the PMOS transistor MP11 is, in general, on the boundary between on and off. However, substantially, the source voltage (2.8 V) of the PMOS transistor MP11 is lower than the well voltage (3.3 V), and thus the threshold voltage of the PMOS transistor MP11 becomes about −0.8 V due to influence of substrate effect. Accordingly, the PMOS transistor MP11 becomes off state. On the other hand, in the NMOS transistor MN11 provided in the storage unit SM1, the source voltage indicates 0.5 V, and the gate voltage indicates 2.7 V so that the NMOS transistor MN11 becomes on state at a low resistance. Accordingly, the inverter INV11, which is formed with the PMOS transistor MP11 and NMOS transistor MN11, outputs L-level signal of 0.5 V. In other words, the storage unit SM1 normally operates.

Subsequently, the switch SW1 is turned off, and then the sampled subframe data is held in the storage unit SM1. Specifically, the inverter INV12 inverts the L-level output signal of the inverter INV11 and outputs the H-level signal, and the inverter INV11 inverts the H-level output signal of the inverter INV12 and outputs the L-level signal. At this time, the voltage of node a is level-shifted from 2.7 V to 2.8 V of the voltage V1.

Similarly, the forward subframe data of the bit B1 is written into the storage units SM1 of all the pixels 12 which constitute the image display unit 11. Accordingly, the subframe data having the amplitude of 2.3 V is held in the storage units SM1 of all the pixels 12.

Subsequently, the trigger pulse TRI of the H-level (and the trigger pulse TRIB of the L-level) is simultaneously supplied to all the pixels 12 which constitute the image display unit 11 (time T5).

Thus, the switches SW2 of all the pixels 12 are turned on so that the forward subframe data of the bit B1, which has 2.3 V amplitude and is stored in the storage units SM1, is simultaneously transferred to and held in the storage units DM2 via the switches SW2, and is applied to the reflecting electrode PE at the same time. The capacitance C1 provided in the storage units DM2 can hold the analogue data, and thus hold the voltages V0 and V1 which are arbitrarily set within a range of the ground voltage GND to power supply voltage VDD.

In addition, as can be seen from FIG. 7(C), a period in which the forward subframe data of the bit B1 is held by the storage unit DM2 (a period in which the forward subframe data of the bit B1 is applied to the reflecting electrode PE) corresponds to one subframe period from a time T5 when the trigger pulse TRI becomes the H-level to a time T6 when the trigger pulse TRI becomes H-level again.

On the other hand, as shown in FIG. 7(D), during the subframe period in which the forward subframe data of the bit B1 is applied to the reflecting electrode PE, the common electrode voltage Vcom is set to a voltage which is lower by the threshold voltage Vtt of the liquid crystal than 0.5 V. Hence, as shown in FIG. 7(E), in the subframe period (from time T5 to time T6) in which the forward subframe data of the bit B1 is applied to the reflecting electrode PE, the voltage applied to the liquid crystal LCM is 2.3 V+Vtt (=2.8 V−(0.5 V−Vtt)) when the bit value of the subframe data is "1", and is Vtt (=0.5 V−(0.5 V−Vtt)) when the bit value of the subframe data is "0".

(Writing Operation of Subframe Data of Bit B1*b*)

In all the pixels 12, after the forward subframe data of the bit B1 is transferred from the storage unit SM1 to the storage unit DM2 and the reflecting electrode PE (time T5), the writing of the inverted subframe data of the bit B1 into the storage unit SM1 of all the pixels 12 is sequentially started at an arbitrary timing before the elapse of the period (time T6) during the forward subframe data of the bit B1 is displayed by the liquid crystal display element LC (time T5*a*).

At this time, the signal amplitude of the subframe data which is output from the horizontal driver 16 to the column data line d is 3.3 V. An amplitude of the gate control voltage of the switch SW1 (voltage amplitude of row scanning line g) is also 3.3 V. Accordingly, the voltage of input terminal (node a) of the storage unit SM1 is 0 V when the subframe data is L-level, and the voltage of input terminal (node a) is 2.7 V (=3.3 V−threshold voltage of 0.6 V) when the subframe data is H-level.

For example, in a case that the subframe data, which propagates in the column data line d, indicates H-level (3.3 V), the voltage of the input terminal (node a) of the storage unit SM1 is 2.7 V (=3.3 V−threshold voltage 0.6 V). In addition, the voltage of the high-potential-side power supply line V1 indicates 2.8 V. At this time, in the PMOS transistor MP11 provided in the storage unit SM1, the gate voltage indicates 2.7 V and the well voltage (back gate voltage) indicates 3.3 V so that the gate voltage based on the well voltage is −0.6 V. Accordingly, when the threshold voltage of the PMOS transistor MP11 is −0.6 V, the PMOS transistor MP11 is, in general, on the boundary between on and off. However, substantially, the source voltage (2.8 V) of the PMOS transistor MP11 is lower than the well voltage (3.3 V), and thus the threshold voltage of the PMOS transistor MP11 becomes about −0.8 V due to influence of substrate effect. Accordingly, the PMOS transistor MP11 becomes off state. On the other hand, in the NMOS transistor MN11 provided in the storage unit SM1, the source voltage indicates 0.5 V, and the gate voltage indicates 2.7 V so that the NMOS transistor MN11 becomes on state at a low resistance. Accordingly, the inverter INV11, which is formed with the PMOS transistor MP11 and NMOS transistor MN11, outputs L-level signal of 0.5 V. In other words, the storage unit SM1 normally operates.

Subsequently, the switch SW1 is turned off, and then the sampled subframe data is held in the storage unit SM1. Specifically, the inverter INV12 inverts the L-level output signal of the inverter INV11 and outputs the H-level signal, and the inverter INV11 inverts the H-level output signal of the inverter INV12 and outputs the L-level signal. At this time, the voltage of node a is level-shifted from 2.7 V to 2.8 V of the voltage V1.

Similarly, the inverted subframe data of the bit B1 is written into the storage units SM1 of all the pixels 12 which constitute the image display unit 11. Accordingly, the subframe data having the amplitude of 2.3 V is held in the storage units SM1 of all the pixels 12.

Subsequently, the trigger pulse TRI of the H-level (and the trigger pulse TRIB of the L-level) is simultaneously supplied to all the pixels 12 which constitute the image display unit 11 (time T6).

Thus, the switches SW2 of all the pixels 12 are turned on so that the inverted subframe data of the bit B1, which has 2.3 V amplitude and is stored in the storage units SM1, is simultaneously transferred to and held in the storage units DM2 via the switches SW2, and is applied to the reflecting electrode PE at the same time. The capacitance C1 provided in the storage units DM2 can hold the analogue data, and thus hold the voltages V0 and V1 which are arbitrarily set within a range of the ground voltage GND to power supply voltage VDD.

In addition, as can be seen from FIG. 7(C), a period of holding the inverted subframe data of the bit B1 (a period in which the inverted subframe data of the bit B1 is applied to the reflecting electrode PE) in the storage unit DM2 is one subframe period from the time T6 when the trigger pulse TRI is the H-level to a time T7 when the trigger pulse TRI becomes H-level again.

Here, since the inverted subframe data of the bit B1 and the forward subframe data of the bit B1 have the relationship of the reserve logical value at all times, the inverted subframe data of the bit B1 indicates "0" when the forward subframe data of the bit B1 is "1", the inverted subframe data of the bit B1 indicates "1" when the forward subframe data of the bit B1 is "0".

On the other hand, as shown in FIG. 7(D), during the subframe period in which the inverted subframe data of the bit B1 is applied to the reflecting electrode PE, the common electrode voltage Vcom is set to a voltage which is higher by the threshold voltage Vtt of the liquid crystal than 2.8 V. Hence, as shown in FIG. 7(E), in the subframe period (from time T6 to time T7) in which the inverted subframe data of the bit B1 is applied to the reflecting electrode PE, the voltage applied to the liquid crystal LCM is −Vtt (=2.8 V−(2.8 V+Vtt)) when the bit value of the subframe data is "1", and is −2.3 V−Vtt (=0.5 V−(2.8 V+Vtt)) when the bit value of the subframe data is "0".

Consequently, as shown in FIG. 7(E), during the two subframe periods of the times T5 to T7, the pixel 12 displays the same gradation as the bit B1 and the complementary bit B1*b* of the bit B1, and performs alternating driving of reversing the potential direction of the liquid crystal LCM per subframe, so that it is possible to prevent burn-in of the liquid crystal LCM. The same operation is also repeatedly performed on the bit B2 and subsequent bits.

In this way, the liquid crystal display device 10 displays the gradation in a combination of a plurality of subframes.

In addition, each display period of the bit B0 and the complementary bit B0*b* is the same first subframe period, and, furthermore, each display period of the bit B1 and the complementary bit B1*b* is also the same second subframe period. However, the first subframe period and the second subframe period are not necessarily the same period. In this regard, as shown in FIG. 7(E), a certain pair of two subframe periods is set to twice the immediately preceding pair of two subframe periods. The duration of each subframe period and the number of subframes can be optionally set according to a system specification or the like.

Figure 9:
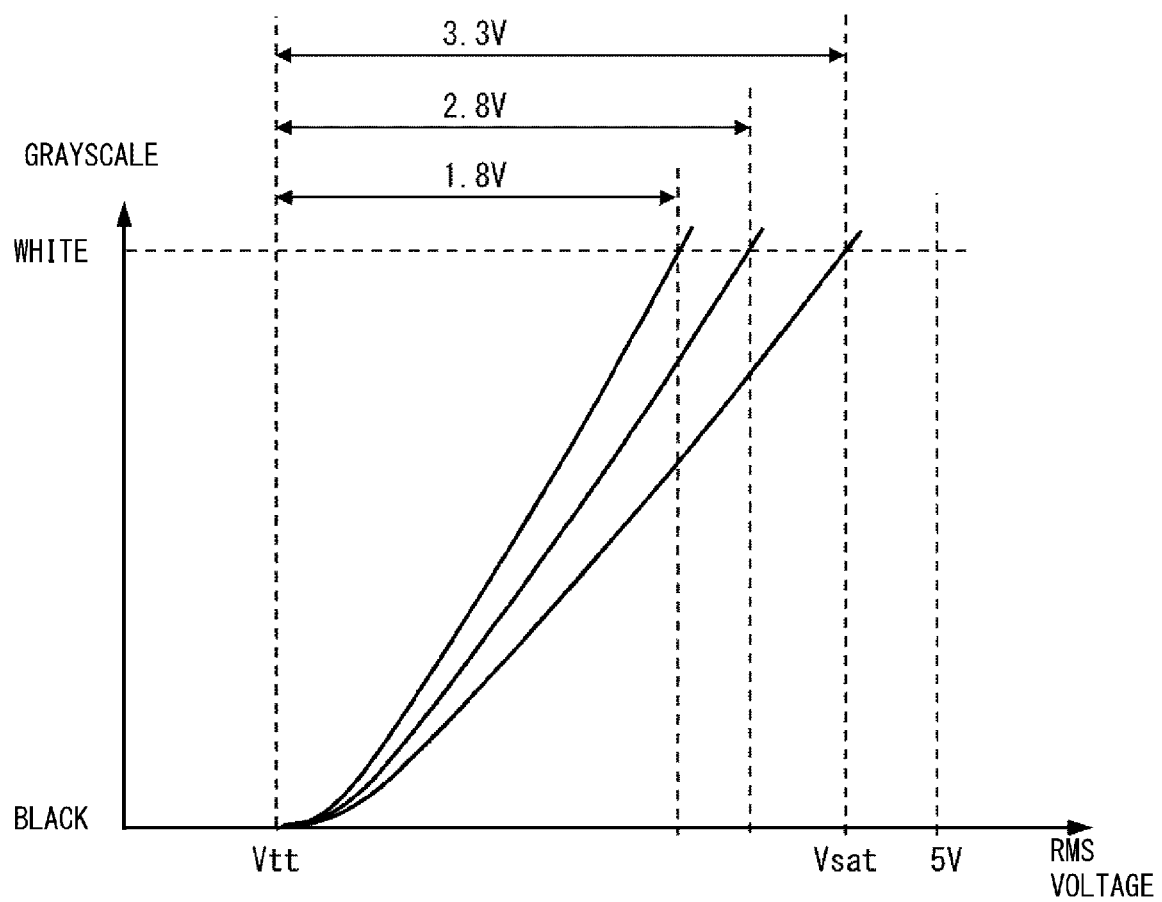
FIG. 9 is a graph showing a relationship between an applied voltage (RMS voltage) of liquid crystal and a grayscale value of liquid crystal in the liquid crystal display device according to the first embodiment.

FIG. 9 shows a relationship between an applied voltage (RMS voltage) of a liquid crystal and a liquid crystal grayscale value. As shown in FIG. 9, a grayscale value curve is shifted in such a manner that a black grayscale value corresponds to the RMS voltage of the threshold voltage Vtt of the liquid crystal and a white grayscale value corresponds to the RMS voltage of a saturation voltage of the liquid crystal. For example, a liquid crystal projector has three-panel system using three panels corresponding to the three primary colors of RGB, but the saturation voltage of the liquid crystal differs depending on each of R, G, and B colors. The saturation voltage Vsat of the Red panel is the highest, then the saturation voltage Vsat of the Green panel is high, and the saturation voltage Vsat of the Blue panel is the lowest. In the Red panel, for example, the white grayscale value is shifted to correspond to the RMS voltage of a 3.3 V+Vtt saturation voltage Vsat. In the Green panel, the white grayscale value is shifted to correspond to the RMS voltage of a 2.8 V+Vtt saturation voltage Vsat. In the Blue panel, the white grayscale value is shifted to correspond to the RMS voltage of a 1.8 V+Vtt saturation voltage Vsat. Thereby, the grayscale value can be matched with the effective portion of the liquid crystal response curve. Therefore, the liquid crystal display element LC displays white in the Red panel when the voltage applied to the liquid crystal LCM is (3.3 V+Vtt) as described above, and displays black when the voltage applied to the liquid crystal LCM is +Vtt. Further, the liquid crystal display element LC displays white in the Green panel when the voltage applied to the liquid crystal LCM is (2.8 V+Vtt), and displays black when the voltage applied to the liquid crystal LCM is +Vtt. Further, the liquid crystal display element LC displays white in the Blue panel when the voltage applied to the liquid crystal LCM is (1.8 V+Vtt), and displays black when the voltage applied to the liquid crystal LCM is +Vtt. Accordingly, the voltages V0 and V1 of the panel of each color are determined. For example, the voltages can be set as follows: V0=0 V (=GND) and V1=3.3 V (=VDD) in the Red panel, V0=0.5 V and V1=2.8 V in the Green panel, and V0=0.75 V and V1=2.55 V in the Blue panel, and so on.

Since the voltages V0 and V1 can be set to arbitrary voltages as analog voltages, the voltages may be uses for adjustment after manufacturing in consideration of cell gap variation of the manufactured liquid crystal or the like.

As described above, in the liquid crystal display device 10 and the driving method therefor according to the present embodiment, each of the voltages (voltages V1 and V0) to the storage units SM1 provided in all the pixels 12 through the high-potential-side power supply line V1 and the low-potential-side power supply line V0 are fixed to the voltage of the black display level, and are simultaneously transferred to the storage unit DM2 and the reflecting electrode PE at the arbitrary timing within the subframe period, whereby the subframe period is substantially shortened. Therefore, in the liquid crystal display device 10 and the driving method therefor according to the present embodiment, even when the time required to write the subframe data into all the pixels 12 increases with the increase in the number of pixels, a desired subframe period can be secured, and thus the number of gradations can be increased. As a result, the image quality can be improved.

In the present embodiment, the case where the switch SW1 is configured by the NMOS transistor MN1 is described as an example, the present invention is not limited thereto. The switch SW1 may be configured by the PMOS transistor MP1. In this case, the voltage level of the row scanning line g supplied to the gate of the PMOS transistor MP1 is controlled so as to have the relationship of the reverse logic with respect to that in the NMOS transistor MN1.

In the present embodiment, the case is described as an example in which the voltages (voltages V1 and V0) of the high-potential-side power supply line V1 and the low-potential-side power supply line V0 are fixed to the voltage of the black display level at the arbitrary timing within the subframe period, the present invention is not limited thereto. The voltages V1 and V0 may be fixed to the voltage of the white display level or any other voltages of desired display levels at the arbitrary timing within the subframe period. When the voltages V1 and V0 are fixed to the voltage of the white display level, a white display subframe period increases in the entire frame time, so that the panel can be brightened. Such a driving method is employed in, for example, a high-brightness projector or the like.

Furthermore, in the present embodiment, the case is described as an example in which a part of the subframe period of the minimum bit is masked with the data of the black display level (subframe period of the minimum bit is substantially shortened), but the present invention is not limited thereto. It is generally known that the moving picture performance is improved by inserting the black screen in units of frames. Therefore, the driving method of the liquid crystal display device 10 according to the present embodiment is also used to improve the moving picture performance, and a part of each of the subframe periods may be masked with the data of the black display level.

According to this embodiment, it is possible to provide a liquid crystal display device capable of improving image quality and a driving method therefor.

What is claimed is:

1. A liquid crystal display device comprising:
a plurality of pixels each configured to display an image of a gradation level obtained by combining a plurality of 1-bit subframe data for each frame, and provided in a matrix pattern; and
a fixed data control circuit; and
a data control circuit configured to output a video signal which is input to the plurality of pixels, wherein
each of the pixels includes:
a SRAM cell;
a DRAM cell; and
a liquid crystal display element,
the SRAM cell includes:
a first switch configured to sample the subframe data of the video signal; and
a first data holding unit including a first inverter and a second inverter and including a configuration in which an output terminal of one of the first and second inverters is connected to an input terminal of the other one of the first and second inverters and an output terminal of the other one of the first and second inverters is connected to an input terminal of the one of the first and second inverters and configured to hold the subframe data sampled by the first switch,
the first inverter is configured by a first PMOS transistor and a first NMOS transistor and configured to invert and output any one of the subframe data sampled by the first switch and an output of a second inverter,
the second inverter is configured by a second PMOS transistor and a second NMOS transistor and configured to invert and output an output of the first inverter,
a high-potential-side power supply line for supplying a high-potential-side signal voltage is connected to sources of the first and second PMOS transistors,
a low-potential-side power supply line for supplying a low-potential-side signal voltage is connected to the sources of the first and second NMOS transistors, the DRAM cell includes:
    a second switch configured to sample the subframe data held in the first data holding unit at a timing different from the first switch; and
    a second data holding unit configured to hold the subframe data sampled by the second switch for one subframe period and to apply the held subframe data to a reflecting electrode of the liquid crystal display element, and
the fixed data control circuit is configured to supply a pulse waveform to the high-potential-side power supply line and the low-potential-side so as to overwrite the subframe data held in the first data holding unit provided in each of the plurality of pixels with fixed data that differ from the subframe data, and to transfer the fixed data held in the first data holding unit to the second data holding unit by turning on the second switch provided in each of the plurality of pixels.

2. The liquid crystal display device according to claim 1, wherein the fixed data is data of a black display level.

3. The liquid crystal display device according to claim 1, wherein the fixed data control circuit is configured to overwrite the subframe data held in the first data holding unit provided in each of the plurality of pixels with fixed data that differ from the subframe data within the period in which the liquid crystal display element displays the subframe data.

4. A driving method for a liquid crystal display device including:
    a plurality of pixels each configured to display an image of a gradation level obtained by combining a plurality of 1-bit subframe data for each frame, and provided in a matrix pattern;
    a fixed data control circuit; and
    a data control circuit configured to output a video signal which is input to the plurality of pixels,
    each of the pixels including:
        a SRAM cell;
        a DRAM cell; and
        a liquid crystal display element,
    the SRAM cell including:
        a first switch configured to sample the subframe data of the video signal; and
        a first data holding unit including a first inverter and a second inverter and including a configuration in which an output terminal of one of the first and second inverters is connected to an input terminal of the other one of the first and second inverters and an output terminal of the other one of the first and second inverters is connected to an input terminal of the one of the first and second inverters and configured to hold the subframe data sampled by the first switch,
    the first inverter is configured by a first PMOS transistor and a first NMOS transistor and configured to invert and output any one of the subframe data sampled by the first switch and an output of a second inverter,
    the second inverter is configured by a second PMOS transistor and a second NMOS transistor and configured to invert and output an output of the first inverter,
    a high-potential-side power supply line for supplying a high-potential-side signal voltage is connected to sources of the first and second PMOS transistors,
    a low-potential-side power supply line for supplying a low-potential-side signal voltage is connected to the sources of the first and second NMOS transistors,
    the DRAM cell including:
        a second switch configured to sample the subframe data held in the first data holding unit at a timing different from the first switch; and
        a second data holding unit configured to hold the subframe data sampled by the second switch for one subframe period and to apply the held subframe data to a reflecting electrode of the liquid crystal display element,
    the driving method for a liquid crystal display device, comprising:
        supplying a pulse waveform to the high-potential-side power supply line and the low-potential-side so as to overwrite, by the fixed data control circuit, the subframe data held in the first data holding unit provided in each of the plurality of pixels with fixed data that differ from the subframe data; and
        transferring, by the fixed data control circuit, the fixed data held in the first data holding unit to the second data holding unit by turning on the second switch provided in each of the plurality of pixels.

5. The driving method for a liquid crystal display device according to claim 4, wherein the fixed data is data of a black display level.

* * * * *